United States Patent
Horvitz et al.

(10) Patent No.: US 7,243,130 B2
(45) Date of Patent: *Jul. 10, 2007

(54) NOTIFICATION PLATFORM ARCHITECTURE

(75) Inventors: Eric J. Horvitz, Kirkland, WA (US); David O. Hovel, Bellevue, WA (US); Andrew W. Jacobs, Seattle, WA (US); Carl M. Kadie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 888 days.

This patent is subject to a terminal disclaimer.

(21) Appl. No.: 10/220,419

(22) PCT Filed: Mar. 16, 2001

(86) PCT No.: PCT/US01/08711

§ 371 (c)(1), (2), (4) Date: Apr. 1, 2003

(87) PCT Pub. No.: WO01/69387

PCT Pub. Date: Sep. 20, 2001

(65) Prior Publication Data

US 2004/0128359 A1 Jul. 1, 2004

(51) Int. Cl.
*G06F 15/16* (2006.01)

(52) U.S. Cl. ............... 709/207; 709/206; 709/232

(58) Field of Classification Search ............ 709/223, 709/224, 245, 206, 207, 219, 238, 240, 225, 709/232

See application file for complete search history.

(56) References Cited

U.S. PATENT DOCUMENTS 5,377,354 A   12/1994   Scannell et al.

(Continued)

FOREIGN PATENT DOCUMENTS

EP   0420779   8/1990

(Continued)

OTHER PUBLICATIONS

T. Joachims, Text categorization with support vector machines: learning with many relevant features, Machine Learning, European Conference on Machine Learning, Apr. 21, 1998, pp. 137-142.

(Continued)

*Primary Examiner*—William Vaughn
*Assistant Examiner*—Yemane M. Gerezgiher
(74) *Attorney, Agent, or Firm*—Amin, Turocy & Calvin, LLP

(57) ABSTRACT

The present invention relates to a system (10) and methodology (170, 173, 180, 400, 600, 1000) to enable a variety of information associated with one or more notification sources (26-28) to be directed to one or more notification sinks (36-38) via a notification platform architecture (10). The architecture (10) includes a context analyzer (22) for determining a user's state such as location and attentional focus, wherein the user's state is employed by a notification manager (24) to make decisions regarding what, when and how information generated by the notification sources (26-28) should be forwarded to the notification sinks (36-38), for example. These decisions can include a cost benefit analysis wherein considerations are given as to whether the benefits of notifying the user are outweighed by the costs of disrupting the user. Decision-theoretic policies (177, 180) and/or somewhat less formal heuristic policies (177) can be employed to enable the decision-making process within the notification manager (24).

16 Claims, 23 Drawing Sheets

U.S. PATENT DOCUMENTS

| | | | |
|---|---|---|---|
| 5,493,692 A | 2/1996 | Theimer et al. | |
| 5,508,817 A | 4/1996 | Kunigami | 358/402 |
| 5,544,321 A | 8/1996 | Theimer et al. | |
| 5,555,346 A | 9/1996 | Gross et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,644,363 A | 7/1997 | Mead | |
| 5,717,877 A | 2/1998 | Orton et al. | |
| 5,736,974 A | 4/1998 | Selker | |
| 5,742,905 A | 4/1998 | Pepe et al. | |
| 5,757,916 A | 5/1998 | MacDoran et al. | 380/25 |
| 5,767,852 A | 6/1998 | Keller et al. | 345/348 |
| 5,784,124 A | 7/1998 | D'Alitalia et al. | |
| 5,812,865 A | 9/1998 | Theimer et al. | |
| 5,831,545 A | 11/1998 | Murray et al. | 340/825.49 |
| 5,852,440 A | 12/1998 | Grossman et al. | |
| 5,859,640 A | 1/1999 | de Judicibus | |
| 5,864,848 A | 1/1999 | Horvitz | |
| 5,928,330 A | 7/1999 | Goetz et al. | 709/231 |
| 6,021,403 A | 2/2000 | Horvitz | |
| 6,057,842 A | 5/2000 | Knowlton et al. | |
| 6,067,565 A | 5/2000 | Horvitz | |
| 6,094,681 A * | 7/2000 | Shaffer et al. | 709/224 |
| 6,101,531 A | 8/2000 | Eggleston et al. | |
| 6,144,363 A | 11/2000 | Alloul et al. | |
| 6,167,448 A * | 12/2000 | Hemphill et al. | 709/224 |
| 6,301,609 B1 | 10/2001 | Aravamudan et al. | |
| 6,327,581 B1 | 12/2001 | Platt | |
| 6,337,699 B1 | 1/2002 | Nielson | |
| 6,342,908 B1 | 1/2002 | Bates et al. | |
| 6,360,101 B1 * | 3/2002 | Irvin | 455/456.6 |
| 6,400,810 B1 * | 6/2002 | Skladman et al. | 379/93.24 |
| 6,425,127 B1 | 7/2002 | Bates et al. | |
| 6,438,618 B1 * | 8/2002 | Lortz et al. | 719/318 |
| 6,456,307 B1 | 9/2002 | Bates et al. | |
| 6,459,913 B2 | 10/2002 | Cloutier | |
| 6,466,232 B1 | 10/2002 | Newell et al. | |
| 6,480,207 B1 | 11/2002 | Bates et al. | |
| 6,513,026 B1 | 1/2003 | Horvitz et al. | |
| 6,513,046 B1 | 1/2003 | Abbott, III et al. | |
| 6,549,915 B2 | 4/2003 | Abbott, III et al. | |
| 6,584,502 B1 * | 6/2003 | Natarajan et al. | 709/224 |
| 6,591,279 B1 * | 7/2003 | Emens et al. | 707/201 |
| 6,618,716 B1 | 9/2003 | Horvitz | |
| 6,622,160 B1 | 9/2003 | Horvitz | |
| 6,650,902 B1 * | 11/2003 | Richton | 455/456.3 |
| 6,714,967 B1 | 3/2004 | Horvitz | |
| 6,747,675 B1 | 6/2004 | Abbott et al. | |
| 6,791,580 B1 | 9/2004 | Abbott et al. | |
| 6,801,223 B1 | 10/2004 | Abbot et al. | |
| 6,812,937 B1 | 11/2004 | Abbott et al. | |
| 6,829,639 B1 * | 12/2004 | Lawson et al. | 709/224 |
| 6,842,877 B2 | 1/2005 | Robarts et al. | |
| 6,965,917 B1 * | 11/2005 | Aloni et al. | 709/206 |
| 7,016,944 B1 * | 3/2006 | Meyer et al. | 709/218 |
| 7,069,309 B1 * | 6/2006 | Dodrill et al. | 709/219 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2001/0049275 A1 * | 12/2001 | Pierry et al. | 455/414 |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0087649 A1 | 7/2002 | Horvitz | |
| 2002/0099817 A1 | 7/2002 | Abbott et al. | |
| 2002/0174199 A1 | 11/2002 | Horvitz | |
| 2003/0028603 A1 | 2/2003 | Aktas et al. | |
| 2003/0046401 A1 | 3/2003 | Abbott et al. | |
| 2003/0154476 A1 | 8/2003 | Abbott, III et al. | |
| 2004/0030753 A1 | 2/2004 | Horvitz | |
| 2004/0061716 A1 | 4/2004 | Cheung et al. | |
| 2004/0225718 A1 | 11/2004 | Heinzel et al. | |
| 2005/0034078 A1 | 2/2005 | Abbott et al. | |
| 2005/0248437 A1 | 11/2005 | Hellebust et al. | |

FOREIGN PATENT DOCUMENTS

| | | |
|---|---|---|
| EP | 0413537 | 2/1991 |
| EP | 0420779 | 4/1991 |
| EP | 8314827 | 11/1996 |
| EP | 0867823 | 9/1998 |
| EP | 095633 | 3/1999 |
| EP | 0905633 | 3/1999 |
| GB | 2328110 | 10/1999 |
| JP | 08314827 | 11/1996 |
| JP | 1079756 | 3/1998 |
| WO | 9635994 | 11/1996 |
| WO | WO 97/38382 | 10/1997 |
| WO | 9800787 | 1/1998 |
| WO | 9837680 | 8/1998 |
| WO | 9847268 | 10/1998 |
| WO | 9858321 | 12/1998 |
| WO | 9906915 | 2/1999 |
| WO | WO 99/41720 | 8/1999 |
| WO | WO 99/67731 | 12/1999 |
| WO | WO 00/36493 | 6/2000 |
| WO | WO 01/69387 A2 | 9/2001 |
| WO | WO 02/39761 | 5/2002 |
| WO | WO 02/065250 A2 | 8/2002 |
| WO | WO 2004/025912 A2 | 3/2004 |

OTHER PUBLICATIONS

International Search Report dated Sep. 29, 2003 for PCT Application Serial No. 00/20685, 3 Pages.

European Search Report dated Jul. 5, 2004 for Application No. EP 04 00 0621, 5 pages.

European Search Report dated Sep. 28, 2004 for Application No. EP 05 10 5299, 4 pages.

Nitin Sawhney, et al. Normadic Radion: Speech and Audio Interaction for Contextual Messaging in Nomadic Environments. ACM Transactions on Computer-Human Interaction, ACM, Sep. 1, 2000. pp. 353-383.

International Search Report dated Sep. 2, 2002, for International Application Serial No. PCT/US01/08710.

Paul E. Baclace, Competitive Agents for Information Filtering, Dec. 1999, 1 page.

M. Marx, et al., Clues: Dynamic Personalized Message Filtering, Proceedings of the ACM 1996 Conference on Computer Supported Cooperative Work, Boston, Nov. 16-20, 1996, pp. 113-121.

Robert M. Losee Jr., Minimizing Information Overload: The Ranking of Electronic Messages, 1989, 11 pages.

Gary Boone, Concept Features in Re: Agent, an Intelligent Email Agent, 1998, 8 pages.

William W. Cohen, Learning Rules that Classify E-Mail, 1996, 11 pages.

Makoto Iwayama, et al., Hierarchical Bayesian Clustering for Automatic Text Classification, 1995, 6 pages.

Jonathan Isaac Helfman, et al., Ishmail: Immediate Identification of Important Information, 1995, 8 pages.

Peter Haddawy, An Overview of Some Recent Developments in Bayesian Problem-Solving Techniques Introduction to This Special Issue, 1999, 9 pages.

Finn V. Jensen, Bayesian Networks Basics, Winter 1995/Spring 1996, 14 pages.

Sanguk Noh, et al., Rational Communicative Behavior in Anti-Air Defense, 1998, 8 pages.

Eric Forvitz, et al., Models of Attention in Computing and Communcation: From Principles to Applications, Communications of the ACM 46(3): 52-29, Mar. 2003.

Marti A. Hearst, et al., Machine Learning in Information Access Papers from the 1996 AAA1 Spring Symposium, 1996, 3 pages.

Andy Harter, et al., A Distributed Location System for the Active Office, IEEE Network, 1994, pp. 62-70.

Guanling Chen, et al., A Survey of Context-Aware Mobile Computing Research, Dartmout Computer Science Technical Report, 2000, 16 pages.

William Noah Schilt, A System Architecture for Context-Aware Mobile Computing, Columbia University, 1995, 153 pages.

Mike Spreitzer et al., Providing Location Information in a Ubiquitos Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38-No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36-No. 7.

Roy Want, et al., The Active Badge Location System, ACM Transactions on Information Systems, Jan. 1992, pp. 91-102, vol. 10-No. 1.

Mark Weiser, Some Computer Science Issues in Ubiquitous Computing, Communicatiosn of the ACM, Jul. 1993, pp. 75-84, vol. 36-No. 7.

M. Billinghurst, et al., An Evaluation of Wearable Information Spaces, Proceedings of the Virtual Reality Annual International Symposium, 1998, 8 pages.

Bradley J. Rhodes, Remeberance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Rememberance Agent: A System for Augmented Theory, The Proceedings of The First International Sysmposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8-No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, 8 pages.

International Search Report dated Aug. 20, 2002 for International Application Serial No. PCT/US01/08711.

Integrating Case-Based Reasoning and Decision Theory, 1997 IEEE.

Bayesian Analysis for Fault Location in Homogeneous Distribtued Systems, 1993 IEEE.

Identifying and Localizing Electrical Components: A Case Study of Adaptive Goal-directed Sensing, 1991 IEEE.

Speaking and Listening on the Run: Design for Wearable Audio Computing, 1998 IEEE.

The Message is the medium, Computer Networks and ISDN Systems, Sep. 29, 1997 1519-1530.

CAFÉ: A Conceptual Model for Managing Information in Electronic Mail, Juha Takkinen and Nahid Shahmehri, Laboratory for Intelligent Information Systems (IISLAB), Department of Computer Information Science, Linkoping University, Sweden, pp. 44-53.

Issues when designing filters in messaging sysems, Computer Communications, Jan. 11, 1995.

Visualizing semantic spaces and author co-citation networks in digital libraries, 1999 Elsevier Science, LTD.

Sofus A. Macskassy, et al., EmailValet: Learning Email Preferences for Wireless Platforms, Rutgers University, User Modeling 1999 Workshop—Machine Learning for User Modeling, Jun. 3, 1999, 4 pages.

International Search Report dated Jun. 28, 2006 for International Patent Application Serial No. PCT/US04/19915, 4 pages.

International Search Report dated Aug. 20, 2002, for International Applications Serial No. PCT/US01/0871.

Costas Tsatsoulis, et al., Intergrating Case-Based Reasoning and Decision Theory, 1997, 10 pages.

Francis Chu, et al., A Decision-Theoretic Approach to Reliable Message Delivery, 1998, 15 pages.

Yu Lo Cyrus Chang, et al., Bayesian Analysis for Fault Location in Homogeneous Distributed Systems, 1993, 10 pages.

Alec Cameron, et al., Identifiying and Localizing Electrical Components: A Case Study of Adaptive Goal-directed Sensing, 1997, 6 pages.

Nitin Sawhney, et al., Speaking and Listening on the Run: Design for Wearable Audio Computing, 1998, 8 pages.

Doree Duncan Sehgmann, et al., The Message is th Medium, 1997, 12 pages.

Jacob Palme, et al., Issues When Designing Filters in Messaging Systems, 1996, 7 pages.

Chaomei Chen, Visualizing Semantic Spaces and Author Co-citation Networks in Digital Libraries, 1999, 20 pages.

International Search Report dated Sep. 29, 2003 for PCT Application Serial No. 00/20685, 3 pages.

* cited by examiner

Fig. 5

Options

I am
- ☐ always available
- ☑ never available
- ☐ available for alerts with an importance greater than
  $ [10] ◀▶ ~100

98

96

Notify me
- ☐ at my desktop
- ☐ by e-mail
- ☐ at my laptop
- ☐ on my cell phone
- ☐ in my car
- ☑ on my pager
- ☐ on my PDA

102

94

92

91

90

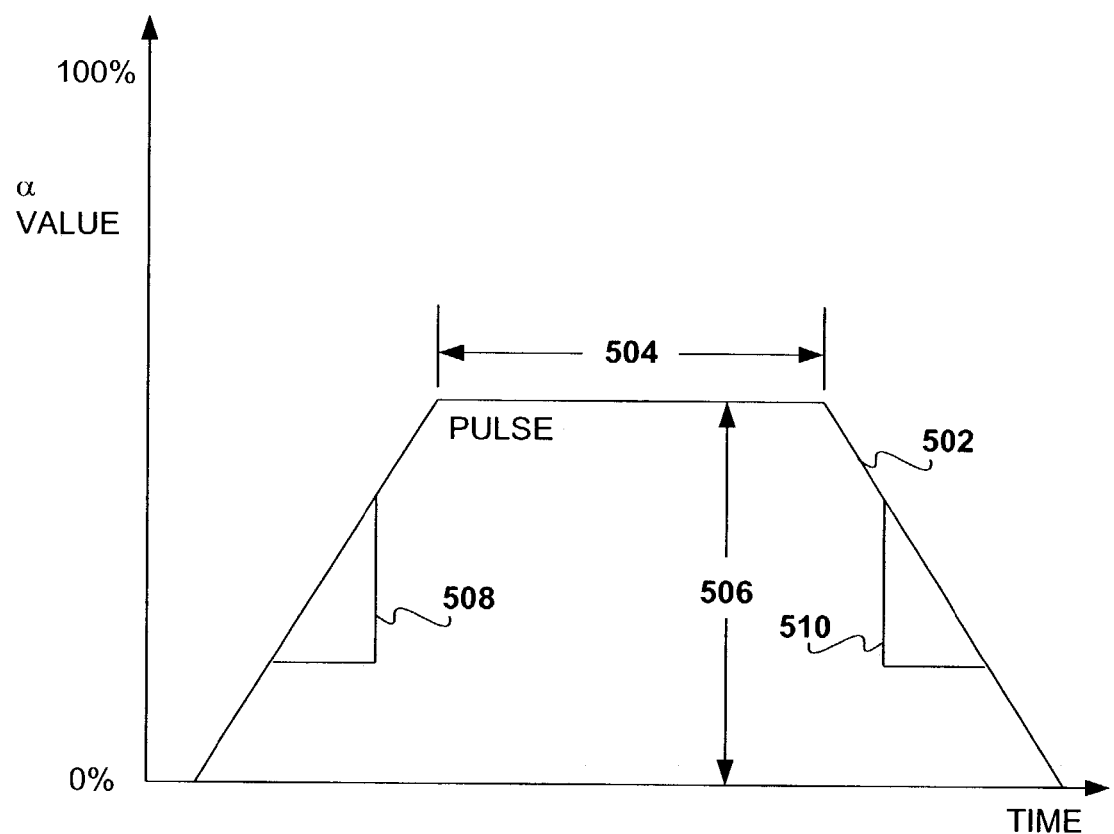
Fig. 16

NOTIFICATION PLATFORM ARCHITECTURE

TECHNICAL FIELD

The present invention relates generally to computer systems, and more particularly to a system and method providing an architecture to facilitate receipt and notification of alerts generated by various devices and applications for conveyance to a user.

BACKGROUND ART

Many computer users today receive information from a number of different sources, and utilize a number of different devices or modalities in order to access this information. For example, a user may receive e-mail and instant messages over a computer, pages over a pager, voice-mail over a phone, such as a cellular ("cell") or landline phone, and news information over the computer. With the ever increasing amount of information available, and the numerous modalities for communicating such information, it difficult for users to receive and process the information according to where the user happens to be, what frame of mind or state the user may be in, and the communications modality that the user may have access to.

As an example, a user may be away from his or her computer, but receive an important e-mail. In many instances however, the user may only have access to a cell phone or a pager. Thus, messages transmitted via one modality (e.g., e-mail) are not automatically transferred or communicated to another modality. Consequently, important time may lapse before the user actually receives the message. In some cases, messages may become useless before they are actually received since the message itself required a response or action by the user within a given timeframe. As another example, the user may be working on the computer, yet have turned off the ringer and voice-mail indicator on the phone in order to avoid disturbances while concentrating on the computer. If an important voice-mail were left during this time, however, the user would generally have no way of knowing whether an important message was received unless they routinely checked the voice mail.

In contrast to potentially not responding to an important message or alert, many messages/alerts received may not be as important to the user. For example, an e-mail from the user's manager or co-worker generally should receive higher priority than reception or review of the latest sports scores. Thus, the value of the information contained in a message or alert should be balanced with the costs associated with disruption to the user. Costs and value may be context sensitive, however. This may include locations the user happens to be, activity in which the user is currently engaged, and the communications modality the user has access to. In addition to managing communications and related modalities as described above, users also receive and subsequently process various other messages and/or alerts. This may include alerts from increasing numbers of services, error messages, and computerized offers for assistance, for example.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology providing an architecture for a notification platform. According to one aspect of the invention, the architecture includes a context analyzer or component, one or more notification sources and sinks, and a notification manager. The context analyzer stores user profile information regarding notification parameters of a user, such as the user's default notification preferences, and provides a user context identification and updating service. Notification sources generate notifications intended for the user, while notification sinks provide the notifications to the user. The notification manager conveys or directs notifications generated by the sources to the sinks, based on information stored and determined by the context analyzer and on information provided or inferred about the urgencies of the notifications. For example, the notification manager can access or infer the context of the user (e.g., the user's current location and focus of attention). This can be achieved based upon a consideration of multiple sources of context information. Such sources of information can include the user's context profile, the user's online calendar, the time of day, events about the world, organization, system, and/or the user's activity, for example. Notifications can then be determined through an analysis of the context and the urgency of the information. This may include determining which of the notifications should be conveyed to the user, via which of the sinks, and in which manner or modality that is provided by the sinks.

According to other aspects of the present invention, a user may, for example, receive e-mail alerts, yet have the e-mail automatically directed to a cell phone, if desired. Similarly, a voice-mail may be directed to a desktop computer, as is suitably determined by the notification manager. Thus, notifications from notification sources are processed by the notification manager, which determines whether the user should be notified. If the manager determines that the user should be notified, then the manager also determines how the user should be notified. This can be based on the information stored in the user profile, including such information as the user's preferences and current context in order to notify desired notification sinks. The sinks can include, for example, a desktop computer, a cell phone, a pager, and/or other device/application.

Furthermore, the architecture of the notification platform can be generalized to substantially any notification, including those associated with a potential provision of a service by a software component in a desktop or mobile setting, for example. Such notifications may include:

alerts about services such as those that seek to automatically provide assistance or tips to a user working with a software application and/or automatically perform scheduling by examining e-mail at the focus of a user's attention;

alerts that notify the user to upcoming appointments or engagements; alerts that relay important changes in the location, proximity, or attentional status of friends and colleagues; and, alerts that issue background queries based on text being composed or reviewed by users and present the results of such background searches to the user.

As described above, the context analyzer determines the current context of the user, such as the user's current location and attentional state. The determined context can be employed to determine whether, when and how notifications intended for the user should be conveyed, for example. According to other aspects of the invention, the context is determined via one or more of: direct specification by the user; direct measurement using one or more sensors; a user-modifiable profile indicating context; one or more potentially user-modifiable rules that indicate context; and/or an inferential analysis utilizing a model, such as a Bayesian or a statistical model. Thus, the context of the user, including the user's location and attentional state (or, focus), can be utilized in conveying notifications to the user.

In accordance with another aspect of the present invention, a decision-theoretic analysis may be employed by the notification manager to determine which notifications received from notification sources should be conveyed to the user, and via which of one or more modes associated with the notification sinks. A value is determined for the notification sinks and related modes, equal to an expected value of information contained within a notification, less an expected cost of disruption to convey the notification via the mode of the sink, less an expected value of the user independently learning the information contained with the notification without notification, and less an actual cost of conveying the notification via the mode and sinks. If this value is greater than a predetermined conveyance threshold, then the notification is conveyed via the mode of the sink having the highest such value, for example. According to another aspect of the present invention, heuristic communications policies may be employed by the notification manager to determine which notifications received from notification sources should be conveyed to the user, and via which modes of associated notification sinks.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF DRAWINGS

FIG. 5 is a diagram illustrating a user specification interface for notifications in accordance with an aspect of the present invention.

FIG. 16 is a diagram illustrating value versus time in accordance with an aspect of the present invention.

MODE(S) FOR CARRYING OUT THE INVENTION

The present invention relates to a system and methodology to enable a variety of information associated with one or more notification sources to be directed to one or more notification sinks (e.g., modality for receiving information) via a notification platform architecture. The architecture includes a context analyzer for determining a user's state such as location and attentional focus, wherein the user's state is employed by a notification manager to make decisions regarding what, when and how information generated by the notification sources should be forwarded to the notification sinks, for example. These decisions can include a cost benefit analysis wherein considerations are given as to whether the benefits of notifying the user are outweighed by the costs of disrupting the user. Decision-theoretic policies and/or somewhat less formal heuristic policies can be employed to enable the decision-making process within the notification manager.

Figure 1:
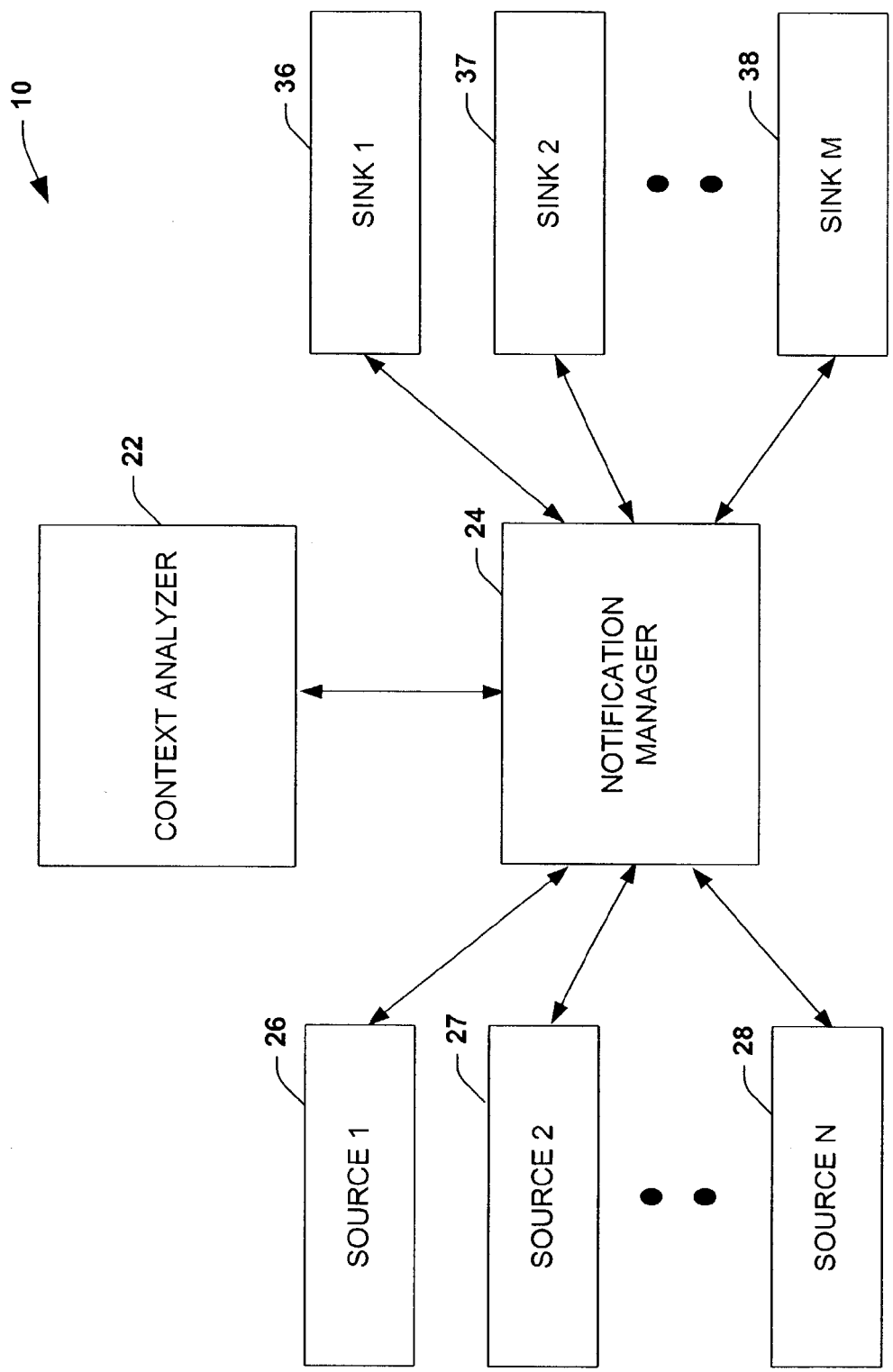
FIG. 1 is a schematic block diagram of a system illustrating a notification platform architecture in accordance with an aspect of the present invention.

Referring initially to FIG. 1, a system 10 illustrates a notification architecture according to an aspect of the present invention. The system 10 includes a context analyzer 22, a notification manager 24 (also referred to as an event broker), one or more notification sources (e.g., modality for providing information) 1 through N, 26, 27, 28 and one or more notification sinks, 1 through M, 36, 37, 38, wherein N an M are integers, respectively. The sources are also referred to as event publishers, while the sinks are also referred to as event subscribers. There can be any number of sinks and sources. In general, the notification manager 24 conveys notifications, which are also referred to as events or alerts, from the sources 26-28 to the sinks 36-38, based in part on parametric information stored in and/or accessed by the context analyzer 22.

The context analyzer 22 stores/analyzes information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have access to in different locations. Such parameters may also be functions of observations made autonomously via one or more sensors. For example, one or more profiles (not shown) may be selected or modified based on information about a user's location as can be provided by a global positioning system (GPS) subsystem, on information about the type of device being used and/or the pattern of usage of the device, and the last time a device of a particular type was accessed by the user. Furthermore, as is described in more detail below, automated inference may also be employed, to dynamically infer parameters or states such as location and attention. The profile parameters may be stored as a user profile that can be edited by the user. Beyond relying on sets of predefined profiles or dynamic inference, the notification architecture can enable users to specify in real-time his or her state, such as the user not being available except for important notifications for the next "x" hours, or until a given time, for example.

The parameters can also include default notification preference parameters regarding a user's preference as to being disturbed by notifications of different types in different settings, which can be used as the basis from which to make notification decisions by the notification manager 24, and upon which a user can initiate changes. The parameters may include default parameters as to how the user wishes to be notified in different situations (e.g., such as by cell phone, by pager). The parameters can include such assessments as the costs of disruption associated with being alerted by different modes in different settings. This can include contextual parameters indicating the likelihood that the user is in different locations, the likelihood that different devices are available, and the likelihood of his or her attentional status at a given time, as well as notification parameters indicating how the user desires to be notified at a given time.

Information stored by the context analyzer 22, according to one aspect of the present invention is inclusive of contextual information determined by the analyzer. The contextual information is determined by the analyzer 22 by discerning the user's location and attentional status based on one or more contextual information sources (not shown), as is described in more detail in a later section of the description. The context analyzer 22, for example, may be able to determine with precision the actual location of the user via a global positioning system (GPS) that is a part of a user's car or cell phone. The analyzer may also employ a statistical model to determine the likelihood that the user is in a given state of attention by considering background assessments and/or observations gathered through considering such information as the type of day, the time of day, the data in the user's calendar, and observations about the user's activity. The given state of attention can include whether the user is open to receiving notification, busy and not open to receiving notification, and can include other considerations such as weekdays, weekends, holidays, and/or other occasions/periods.

The sources 26-28 generate notifications intended for the user and/or other entity. For example, the sources 26-28 may include communications, such as Internet and network-based communications, local desktop computer-based communications, and telephony communications, as well as software services, such as intelligent help, background queries, and automated scheduling. Notification sources are defined generally herein as that which generates events, which can also be referred to as notifications and alerts, intended to alert a user, or a proxy for the user, about information, services, and/or a system or world event. A notification source can also be referred to as an event source.

For example, e-mail may be generated as notifications by an e-mail notification source such that it is prioritized, wherein an application program or system generating the notification assigns the e-mail with a relative priority corresponding to the likely importance or urgency of the e-mail to the user. The e-mail may also be sent without regard to the relative importance to the user. Desktop-centric notifications can include an automated dialog with the goal of alerting a user to a potentially valuable service that he or she may wish to execute (e.g., scheduling from a message), information that the user may desire to review (e.g., derived from a background query), or errors and/or other alerts generated by a desktop computer. Internet-related services can include notifications including information that the user has subscribed to, such as headlines of current news every so often, and stock quotes, for example.

Other notifications can include background queries (e.g., while the user is working, text that the user is currently working on may be reviewed, such that background queries regarding the text are formulated and issued to search engines), and scheduling tasks from a scheduling and/or other program. Notification sources 26-28 can themselves be push-type or pull-type sources. Push-type sources are those that automatically generate and send information without a corresponding request, such as headline news and other Internet-related services that send information automatically after being subscribed to. Pull-type sources are those that send information in response to a request, such as e-mail being received after a mail server is polled. Still other notification sources include the following:

e-mail desktop applications such as calendar systems;
computer systems (e.g., that may alert the user with messages that information about alerts about system activity or problems);
Internet-related services, appointment information, scheduling queries;
changes in documents or numbers of certain kinds of documents in one or more shared folders;
availability of new documents in response to standing or persistent queries for information; and/or,
information sources for information about people and their presence, their change in location, their proximity (e.g., let me know when I am traveling if another coworker or friend is within 10 miles of me"), or their availability (e.g., let me know when Steve is available for a conversation and is near a high-speed link that can support full video teleconferencing").

The notification sinks 36-38 are able to provide notifications to the user. For example, such notification sinks 36-38 can include computers, such as desktop and/or laptop computers, handheld computers, cell phones, landline phones, pagers, automotive-based computers, as well as other systems/applications as can be appreciated. It is noted that some of the sinks 36-38 can convey notifications more richly than other of the sinks. For example, a desktop computer typically has speakers and a relatively large color display coupled thereto, as well as having a higher bandwidth for receiving information when coupled to a local network or to the Internet. Thus, notifications can be conveyed by the desktop computer to the user in a relatively rich manner. Conversely, many cell phones have a smaller display that can be black and white, and receive information at a relatively lower bandwidth, for example. Correspondingly, the information associated with notifications conveyed by cell phones may generally be shorter and geared towards the phone's interface capabilities, for example. Thus, the content of a notification may differ depending on whether it is to be sent to a cell phone or a desktop computer. According to one aspect of the present invention, a notification sink can refer to that which subscribes, via an event subscription service, for example, to events or notifications.

The notification manager 24 accesses the information stored and/or determined by the context analyzer, and determines which of the notifications received from the sources 26-28 to convey to which of the sinks 36-38. Furthermore, the notification manager 24 can determine how the notification is to be conveyed, depending on which of the sinks 36-38 has been selected to send the information to. For example, it may be determined that notifications should be summarized before being provided to a selected sinks 36-38.

The invention is not limited to how the manager 24 makes its decisions as to which of the notifications to convey to which of the notification sinks, and in what manner the notifications are conveyed. In accordance with one aspect, a decision-theoretic analysis can be utilized. For example, the notification manager 24 can be adapted to infer important uncertainties about variables including a user's location, attention, device availability, and amount of time until the user will access the information if there were no alert. The notification manager 24 can then make notification decisions about whether to alert a user to a notification, and if so, the nature of the summarization and the suitable device or devices to employ for relaying the notification. In general, the notification manager 24 determines the net expected value of a notification. In doing so, it can consider the following:

- the fidelity and transmission reliability of each available notification sink;
- the attentional cost of disturbing the user;
- the novelty of the information to the user; the time until the user will review the information on his or her own;
- the potentially context-sensitive value of the information; and/or,
- the increasing and/or decreasing value over time of the information contained within the notification.

Inferences made about uncertainties thus may be generated as expected likelihoods of values such as the cost of disruption to the user with the use of a particular mode of a particular device given some attentional state of the user, for example. The notification manager 24 can make decisions as to one or more of the following:

- what the user is currently attending to and doing (based on, for example, contextual information);
- where the user currently is;
- how important the information is;
- what is the cost of deferring the notification;
- how distracting would a notification be;
- what is the likelihood of getting through to the user; and,
- what is the fidelity loss associated with the use of a specific mode of a given notification sink.

Therefore, the notification manager 24 can perform an analysis, such as a decision-theoretic analysis, of pending and active notifications, evaluates context-dependent variables provided by information sinks and sources, and infers selected uncertainties, such as the time until a user is likely to review information and the user's location and current attentional state.

As used herein, inference refers generally to the process of reasoning about or inferring states of the system 10, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the notification manager 24 can access information stored in a user profile by the context analyzer 22 in lieu of or to support a personalized decision-theoretic analysis. For example, the user profile may indicate that at a given time, the user prefers to be notified via a pager, and only if the notification has a predetermined classification (e.g., importance) level. Such information can be utilized as a baseline from which to start a decision-theoretic analysis, or can be the manner by which the notification manager 24 determines how and whether to notify the user.

According to one aspect of the present invention, the notification platform architecture 10 can be configured as a layer that resides over an eventing or messaging infrastructure. However, the invention is not limited to any particular eventing infrastructure. Such eventing and messaging systems and protocols can include:

- HyperText Transport Protocol (HTTP), or HTTP extensions as known within the art;
- Simple Object Access Protocol (SOAP), as known within the art;
- Windows Management Instrumentation (WMI), as known within the art;
- Jini, as known within the art; and,
- substantially any type of communications protocols, such as those based on packet-switching protocols, for example.

Furthermore, the architecture can be configured as a layer that resides over a flexible distributed computational infrastructure, as can be appreciated by those of ordinary skill within the art. Thus, the notification platform architecture can utilize an underlying infrastructure as a manner by which sources send notifications, alerts and events, and as a manner by which sinks receive notifications, alerts and events, for example. The present invention is not so limited, however.

Figure 2:
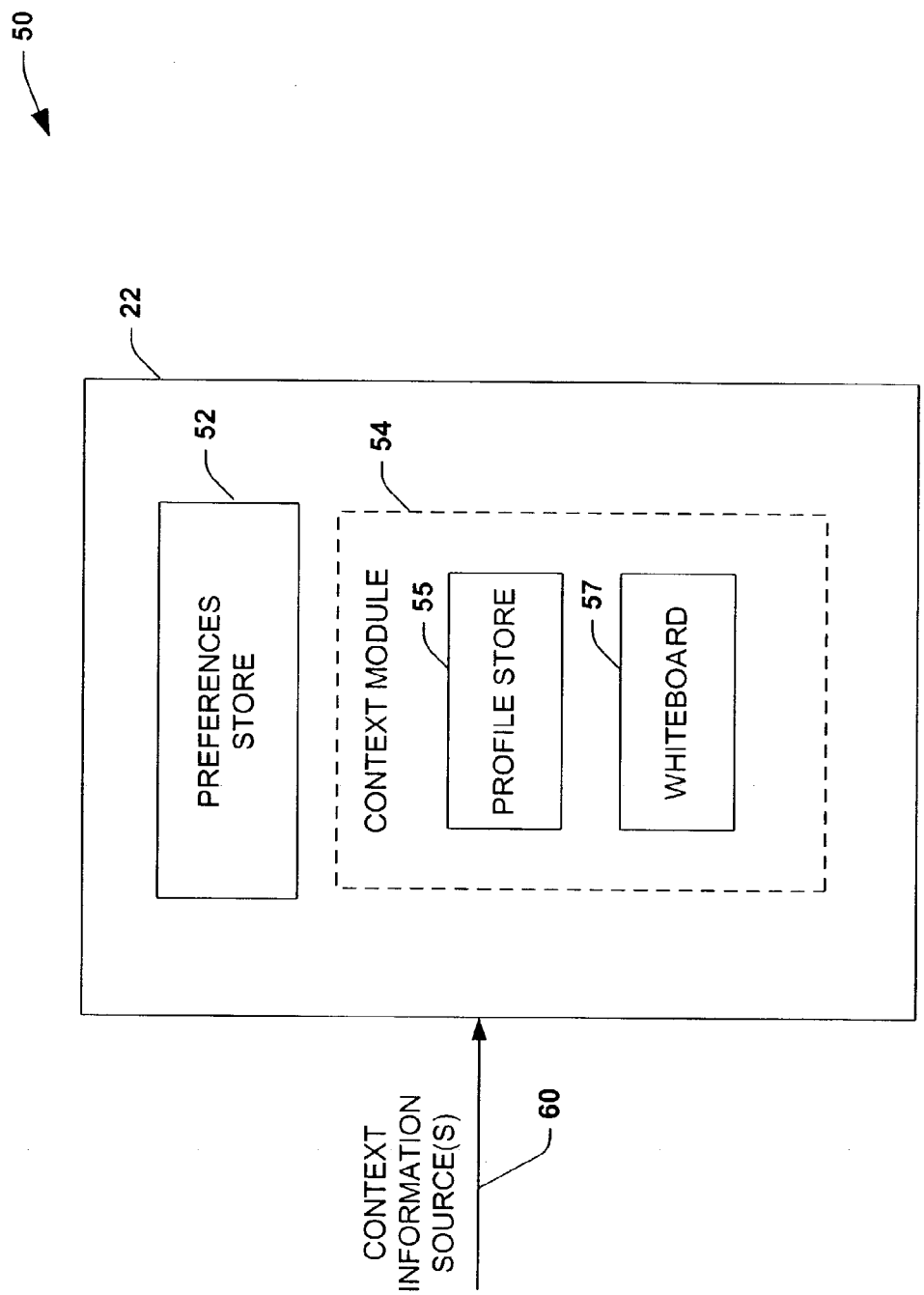
FIG. 2 is a schematic block diagram illustrating a context analyzer in accordance with an aspect of the present invention.

Referring Now to FIG. 2, the context analyzer 22 of the notification architecture described in the previous section of the description is depicted in more detail. The context analyzer 22 as illustrated in FIG. 2 includes a user notification preferences store 52, a user context module 54 that includes a user context profile store 55, and a whiteboard 57. The context analyzer 22 according to one aspect of the invention can be implemented as one or more computer programs executable by a processor of a computer from a machine-readable medium thereof, such as a memory.

The preferences store 52 stores notification parameters for a user, such as default notification preferences for the user, such as a user profile, which can be edited and modified by the user. The preferences store 52 can be considered as that which stores information on parameters that influence how a user is to be notified. The user context module 54 determines a user's current context, based on one or more context information sources 60 as published to the whiteboard 57, for example. The user context profile store 55 stores context parameters for a user, such as the default context settings for the user, which can be edited and modified by the user. That is, the user context module 54 provides a best guess or estimate about a user's current context information by accessing information from the profile store 55 and/or updating a prior set of beliefs in the store 55 with live sensing, via the one or more context sources 60. The profile store 55 can be considered as that which stores a priori where a user is, and what the user is doing, for example.

The user context profile store 55 can be a pre-assessed and/or predefined user profile that captures such information as a deterministic or probabilistic profile. The profile can be of typical locations, activities, device availabilities, and costs and values of different classes of notification as a function of such observations as time of day, type of day, and user interactions with one or more devices. The type of day can include weekdays, weekends and holidays, for example. The user context module 54 can then actively determine or infer aspects of the user's context or state, such as the user's current or future location and attentional state. Furthermore, actual states of context can be accessed directly from the context information sources 60 via the whiteboard 57, and/or, can be inferred from a variety of such observations through inferential methods such as Bayesian reasoning as is described in more detail below.

The context information sources 60 provide information to the context module 54 via the whiteboard 57 regarding the user's attentional state and location, from which the module 54 can make a determination as to the user's current context (e.g., the user's current attentional state and location). Furthermore, the invention is not limited to a particular number or type of context sources 60, nor the type of information inferred or accessed by the user context module 54. However, the context sources 60 can include multiple desktop information and events, such as mouse information, keyboard information, application information (e.g., which application is currently receiving the focus of the user), ambient sound and utterance information, text information in the windows on the desktop, for example. The whiteboard 57 can include a common storage area, to which the context information sources 60 can publish information, and from which multiple components, including sources and the context module 54 can access this information. An event, also referred to as a notification or alert, generally can include information about an observation about one or more states of the world. Such states can include the status of system components, the activity of a user, and/or a measurement about the environment. Furthermore, events can be generated by an active polling of a measuring device and/or source of events, by the receipt of information that is sent on a change, and/or per a constant or varying event heartbeat.

Other types of context sources 60 includes personal-information manager (PIM) information of the user, which generally can provide scheduling information regarding the schedule of the user, for example. The current time of day, as well as the user's location—for example, determined by a global positioning system (GPS), and/or a user's access of a cell phone, PDA, or a laptop that can be locationally determined—are also types of context sources 60. Furthermore, real-time mobile device usage is a type of context source 60. For example, a mobile device such as a cell phone can determine if it is currently being accessed by the user, as well as device orientation and tilt (e.g., indicating information regarding device usage as well), and acceleration and speed (e.g., indicating information as to whether the user is moving or not).

Figure 3:
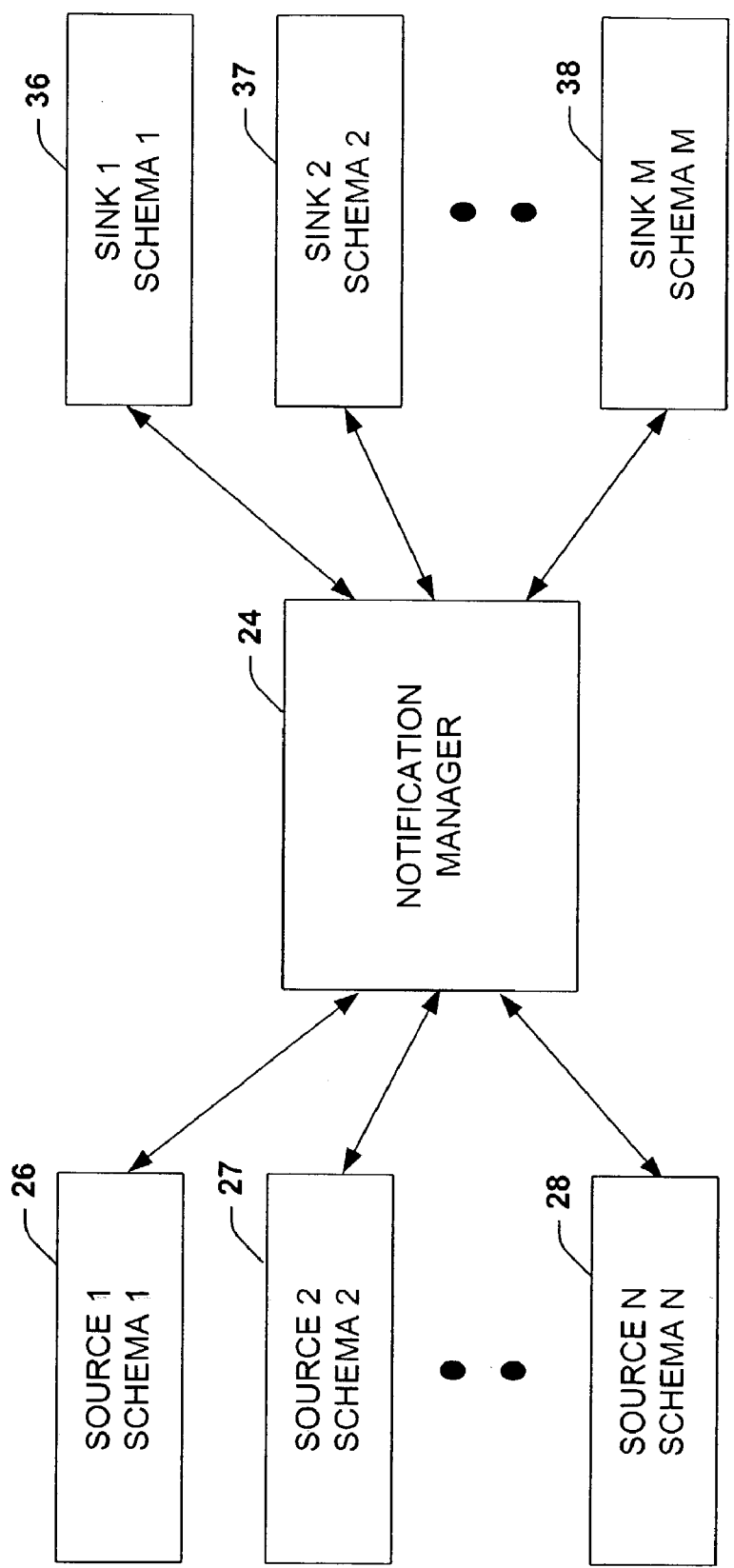
FIG. 3 is a schematic block diagram illustrating notification sources and sinks in accordance with an aspect of the present invention.

Referring now to FIG. 3, the notification sources described above are illustrated in more detail. The notification sources 26-28 typically generate notifications that are conveyed to the notification manager 24, which determines when notifications should occur, and, if so, which of the notifications should be conveyed to which of the notification sinks 36-38 and in what order.

According to one aspect of the present invention, notification sources 26-28 can have one or more of the following parameters within a standard description of attributes and relationships, referred to herein as a notification source schema or source schema. It is noted that schema can be provided for sources, for sinks, and for context-information sources, described above. Such schemas provide declarative information about different components and can enable the sources 26-28, the notification manager 24, the sinks 36-38, and the context analyzer 22 to share semantic information with one another. Thus, different schemas provide information about the nature, urgency, and device signaling modalities associated with notification. That is, schema can be defined generally as a collection of classes and relationships among classes that defines the structure of notifications and events, containing information including event or notification class, source, target, event or notification semantics, ontological content information, observational reliability, and substantially any quality-of-service attributes, for example.

Parameters (not shown) for notification source schema can include one or more of: message class; relevance; importance; time criticality; novelty; content attributes; fidelity tradeoffs, and/or source information summary information. The message class for a notification generated by a notification source indicates the type of communication of the notification, such as e-mail, instant message, numerical financial update, and desktop service, for example. The relevance for a notification generated by notification sources indicates a likelihood that the information contained within the notification is relevant, for one or more specified contexts. For example, the relevance can be provided by a logical flag, indicating whether the source is relevant for a given context or not. The novelty of the notification indicates the likelihood that the user already knows the information contained within the notification. That is, the novelty is whether the information is new to the user, over time (indicating if the user knows the information now, and when, if ever, the user will learn the information in the future without being alerted to it).

Fidelity tradeoffs associated with the notification indicate the loss of value of the information within the notification that can result from different forms of specified allowed truncation and/or summarization, for example. Such truncation and/or summarization may be required for the notification to be conveyed to certain types of notification sinks 36-38 that may have bandwidth and/or other limitations preventing the sinks from receiving the full notification as originally generated. Fidelity in general refers to the nature and/or degree of completeness of the original content associated with a notification. For example, a long e-mail message may be truncated, or otherwise summarized to a maximum of 100 characters allowed by a cell phone, incurring a loss of fidelity. Likewise, an original message containing text and graphics content suffers a loss in fidelity when transmitted via a device that only has text capabilities. In addition, a device may only be able to depict a portion of the full resolution available from the source. Fidelity tradeoffs refer to a set of fidelity preferences of a source stated either in terms of orderings (e.g., rendering importance in order of graphics first, then sound) and/or costs functions that indicate how the total value of the content of the notification diminishes with changes in fidelity. For example, a fidelity tradeoff can describe how the full value associated with the transmission of a complete e-mail message changes with increasingly greater amounts of truncation. Content attributes, for example, can include a summary of the nature of the content, representing such information as whether the core message includes text, graphics, and audio components. The content itself is the actual graphics, text, and/or audio that make up the message content of the notification.

Figure 4:
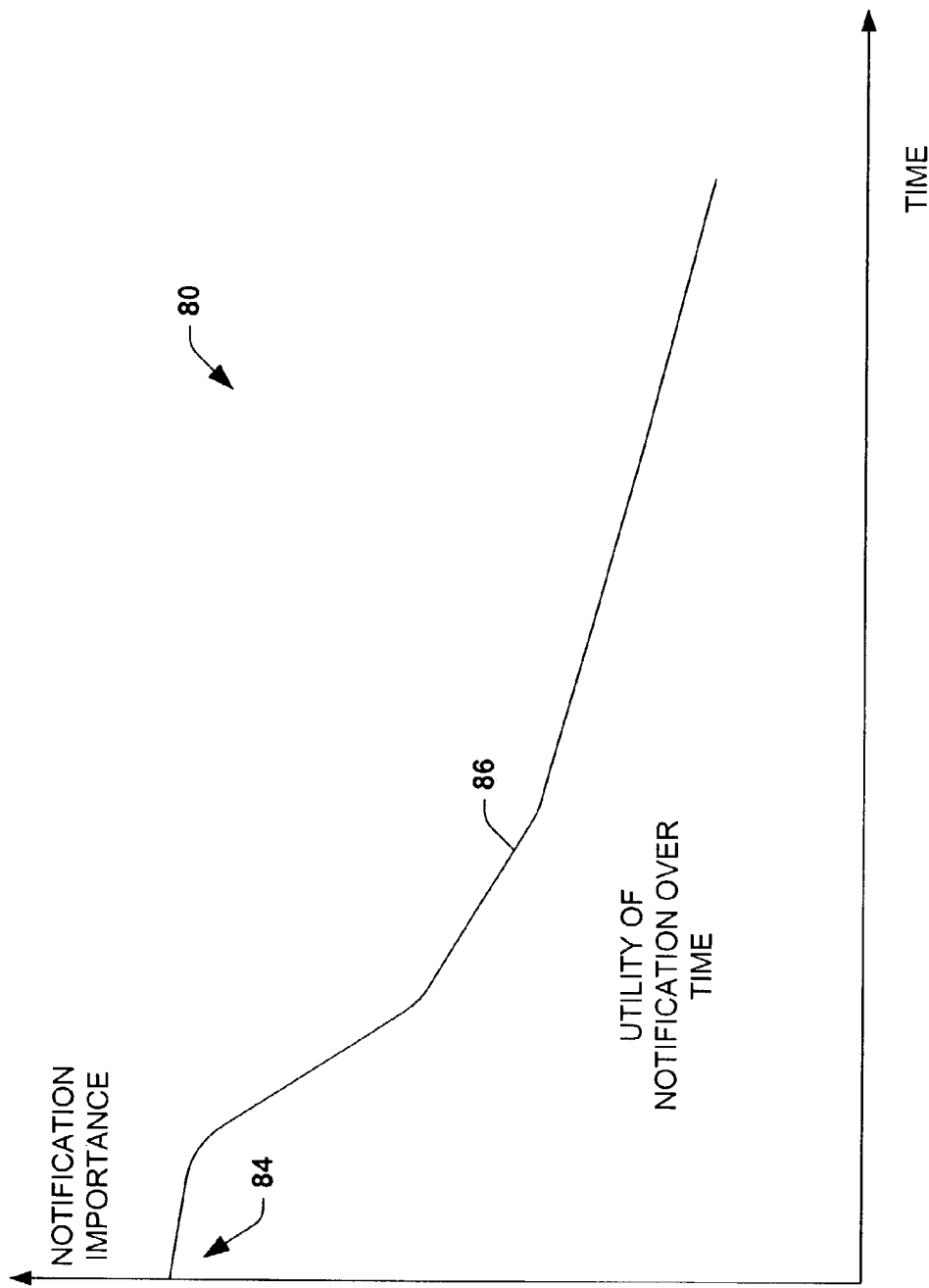
FIG. 4 is a diagram illustrating a utility of notification curve in accordance with an aspect of the present invention.

The importance of a notification refers to the value of the information contained in the notification to the user, assuming the information is relevant in a current context. For example, the importance can be expressed as a dollar value of the information's worth to the user. Time criticality indicates time-dependent change in the value of information contained in a notification that is, how the value of the information changes over time. In most but not all cases, the value of the information of a notification decays with time. This is illustrated in the diagram of FIG. 4. A graph 80 depicts the utility of a notification mapped over time. At the point 84 within the graph, representing the initial time, the importance of the notification is indicated, while the curve 86 indicates the decay of the utility over time.

Referring back to FIG. 3, default attributes and schema templates for different notification sources or source types may be made available in notification source profiles stored in the user notification preferences store, such as the store 52 of FIG. 2. Such default templates can be directed to override values provided by notification sources or to provide attributes when they are missing from schema provided by the sources. Source summary information enables a source to post general summaries of the status of information and potential notifications available from a source. For example, source summary information from a messaging source may include information about the total number of unread messages that are at least some priority, the status of attempts by people to communicate with a user, and/or other summary information.

The notification sinks 36-38 can be substantially any device or application by which the user or other entity can be notified of information contained in notifications. The choice as to which sink or sinks are to be employed to convey a particular notification is determined by the notification manager 24.

Notification sinks 36-38 may have one or more of the following parameters provided within a schema. These parameters may include a device class; modes of signaling (alerting); and, for the associated mode, fidelity/rendering capabilities, transmission reliability, actual cost of communication, and/or attentional cost of disruption, for example. For devices that are adapted for parameterized control of alerting attributes, the schema for the devices can additionally include a description of the alerting attributes and parameters for controlling the attributes, and functions by which other attributes (e.g., transmission reliability, cost of distribution) change with the different settings of the alerting attributes. The schema for notification sinks provides for the manner by which the notification devices communicate semantic information about their nature and capabilities with the notification manager 24 and/or other components of the system. Default attributes and schema templates for different device types can be made available in device profiles stored in the user notification preferences store, such as the store 52 of FIG. 2 as described in the previous section. Such default templates can be directed to override values provided by devices or to provide attributes when they are missing from schema provided by such devices.

Each of the schema parameters is now described in term. The class of the device refers to the type of the device such as a cell phone, a desktop computer, and a laptop computer, for example. The class can also be more general, such as a mobile or a stationery device. The modes of signaling refer to the manner in which a given device can alert the user about a notification. Devices may have one or more notification modes. For example, a cell phone may only vibrate, may only ring with some volume, and/or it can both vibrate and ring. Furthermore, a desktop display for an alerting system can be decomposed into several discrete modes (e.g., a small notification window in the upper right hand of the display vs. a small thumbnail at the top of the screen—with or without an audio herald). Beyond being limited to a set of predefined behaviors, a device can enable modes with alerting attributes that are functions of parameters, as part of a device definition. Such continuous alerting parameters for a mode represent such controls as the volume at which an alert is played at the desktop, rings on a cell phone, and the size of an alerting window, for example.

The transmission reliability for a mode of a notification sink 36-38 indicates the likelihood that the user will receive the communicated alert about a notification, which is conveyed to the user via the sink with that mode. As transmission reliability may be dependent on the device availability and context of the user, the transmission reliability of different modes of a device can be conditioned on such contextual attributes as the location and attention of a user. Transmission reliability for one or more unique contextual states, defined by the cross product of such attributes as unique locations and unique attentional states, defined as disjunctions created as abstractions of such attributes (e.g., for any location away from the home, and any time period after 8 am and before noon), can also be specified. For example, depending on where the user currently is, information transmitted to a cell phone may not always reach the user, particularly if the user is in a region with intermittent coverage, or where the user would not tend to have a cell phone in this location (e.g., family holiday). Contexts can also influence transmission reliability because of ambient noise and/or other masking or distracting properties of the context.

The actual cost of communication indicates the actual cost of communicating the information to the user when contained within a notification that is conveyed to the sink. For example, this cost can include the fees associated with a cell phone transmission. The cost of disruption includes the attentional costs associated with the disruption associated with the alert employed by the particular mode of a device, in a particular context. Attentional costs are typically sensitive to the specific focus of attention of the user. The fidelity/rendering capability is a description of the text, graphics, and audio/tactile capabilities of a device, also given a mode. For example, a cell phone's text limit may be 100 characters for any single message, and the phone may have no graphics capabilities.

Turning now to FIG. 5, an interface 90 illustrates context specifications selectable by a user that can be utilized by the context analyzer 22 in determining a user's current context. The determination of user context by direct specification by the user, and/or a user-modifiable profile, is described. The context of the user can include the attentional focus of the user—that is, whether the user is currently amenable to receiving notification alerts—as well as the user's current location. The present invention is not so limited, however.

Direct specification of context by the user enables the user to indicate whether or not he or she is available to receive alerts, and where the user desires to receive them. A default profile (not shown) can be employed to indicate a default attentional state, and a default location wherein the user can receive the alerts. The default profile can be modified by the user as desired.

Referring to FIG. 5, the interface 90 illustrates how direct specification of context can be implemented, according to an aspect of the present invention. A window 91, for example, has an attentional focus section 92 and a location section 94. In the focus section 92, the user can check one or more check boxes 96, for example, indicating whether the user is always available to receive alerts; whether the user is never available to receive alerts; and, whether the user is only available to receive alerts that has an importance level greater than a predetermined threshold. It is to be appreciated that other availability selections can be provided. As depicted in FIG. 5, a threshold can be measured in dollars, but this is for exemplary purposes only, and the invention is not so limited. The user can increase the threshold in the box 98 by directly entering a new value, or by increasing or decreasing the threshold via arrows 100.

In the location section 94, the user can check one or more of the check boxes 102, to indicate where the user desires to have alerts conveyed. For example, the user can have alerts conveyed at the desktop, by e-mail, at a laptop, on a cell phone, in his or her car, on a pager, or on a personal digital assistant (PDA) device, and so forth. It is to be appreciated that these are examples only, however, and the invention itself is not so limited.

The window 91, wherein there can be preset defaults for the checkboxes 96 and the box 98 of the section 92 and the checkboxes 102 of the section 94, can be considered a default user profile. The profile is user modifiable in that the user can override the default selections with his or her own desired selections. Other types of profiles can also be utilized in accordance with the invention.

Figure 6:
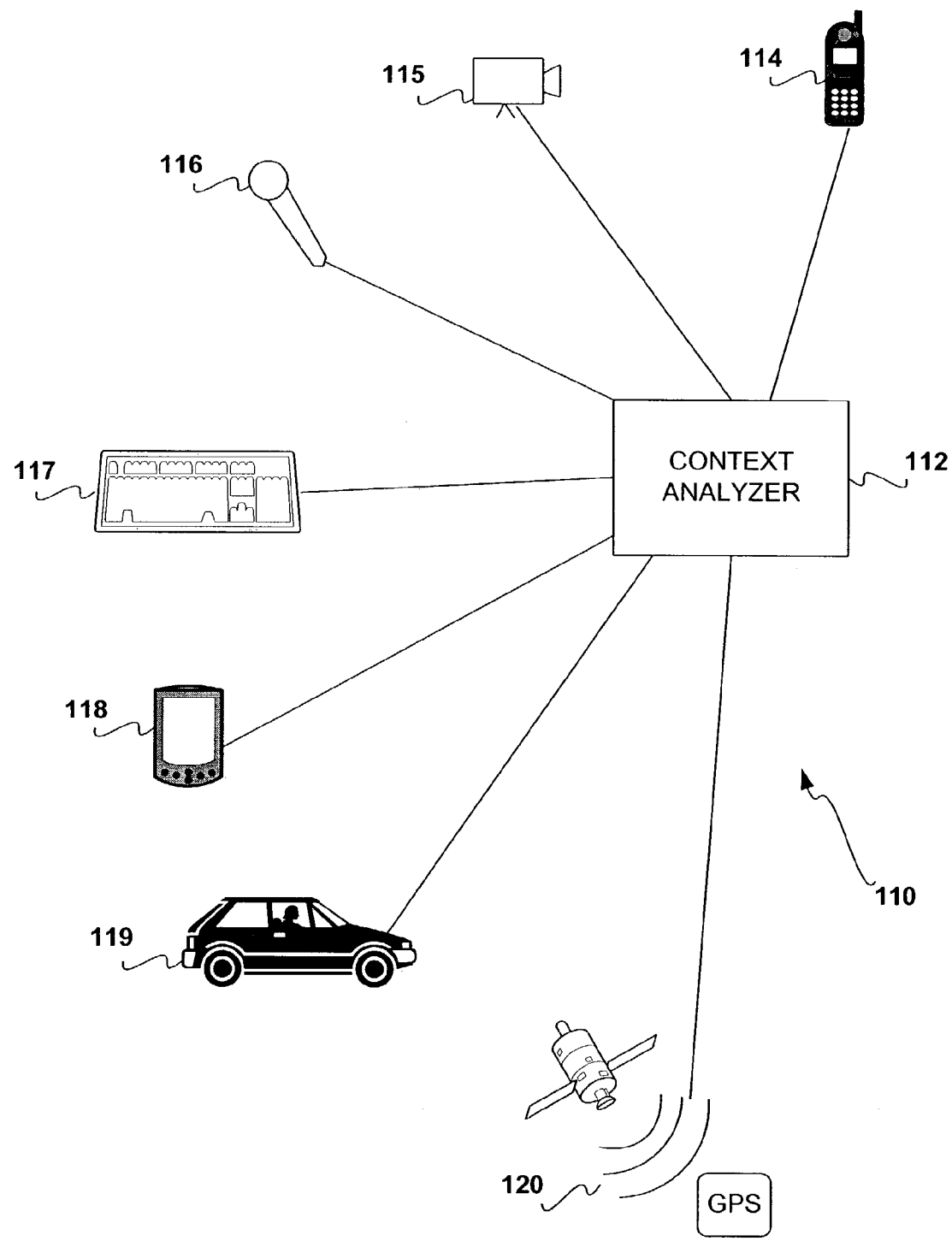
FIG. 6 is a diagram illustrating context information sources in accordance with an aspect of the present invention.

Referring now to FIG. 6, a determination of user context by direct measurement, for example, using one or more sensors, is illustrated in accordance with the present invention. The context of the user can include the user's attentional focus, as well as his or her current location. The invention itself is not so limited, however. Direct measurement of context indicates that sensor(s) can be employed to detect whether the user is currently amenable to receiving alerts, and to detect where the user currently is. According to one aspect of the present invention, an inferential analysis in conjunction with direct measurement can be utilized to determine user context, as is described in a later section of the description.

Referring to FIG. 6, a system 110 in which direct measurement of user context can be achieved is illustrated. The system 110 includes a context analyzer 112, and communicatively coupled thereto a number of sensors 114-120, namely, a cell phone 114, a video camera 115, a microphone 116, a keyboard 117, a PDA 118, a vehicle 119, and a GPS 120, for example. The sensors 114-120 depicted in FIG. 6 are for exemplary purposes only, and do not represent a limitation or a restriction on the invention itself. The term sensor as used herein is a general and overly encompassing term, meaning any device or manner by which the context analyzer 112 can determine what the user's current attentional focus is, and/or what the user's current location is.

For example, if the user has the cell phone 114 on, this can indicate that the user can receive alerts on the cell phone 114. However, if the user is currently talking on the cell phone 114, this can indicate that the user has his or her attentional focus on something else (namely, the current phone call), such that the user should not presently be disturbed with a notification alert. The video camera 115 can, for example, be in the user's office, to detect whether the user is in his or her office (viz., the user's location), and whether others are also in his or her office, suggesting a meeting with them, such that the user should not be disturbed (viz., the user's focus). Similarly, the microphone 116 can also be in the user's office, to detect whether the user is talking to someone else, such that the user should not be disturbed, is typing on the keyboard (e.g., via the sounds emanating therefrom), such that the user should also not be presently disturbed. The keyboard 117 can also be employed to determine if the user is currently typing thereon, such that, for example, if the user is typing very quickly, this may indicate that the user is focused on a computer-related activity, and should not be unduly disturbed (and, also can indicate that the user is in fact in his or her office).

If the PDA device 118 is being accessed by the user, this can indicate that the user is able to receive alerts at the device 118— that is, the location at which notifications should be conveyed is wherever the device 118 is located. The device 118 can also be utilized to determine the user's current attentional focus. The vehicle 119 can be utilized to determine whether the user is currently in the vehicle—that is, if the vehicle is currently being operated by the user. Furthermore, the speed of the vehicle can be considered, for example, to determine what the user's focus is. If the speed is greater than a predetermined speed, for instance, then it may be determined that the user is focused on driving, and should not be bothered with notification alerts. The GPS device 120 can also be employed to ascertain the user's current location, as known within the art.

In the following section of the detailed description, a determination of user context according to user-modifiable rules is described. The context of the user can include the user's attentional focus, as well as his or her current location. The invention is not so limited, however. Determining context via rules indicates that a hierarchical set of if-then rules can be followed to determine the user's location and/or attentional focus.

Figure 7:
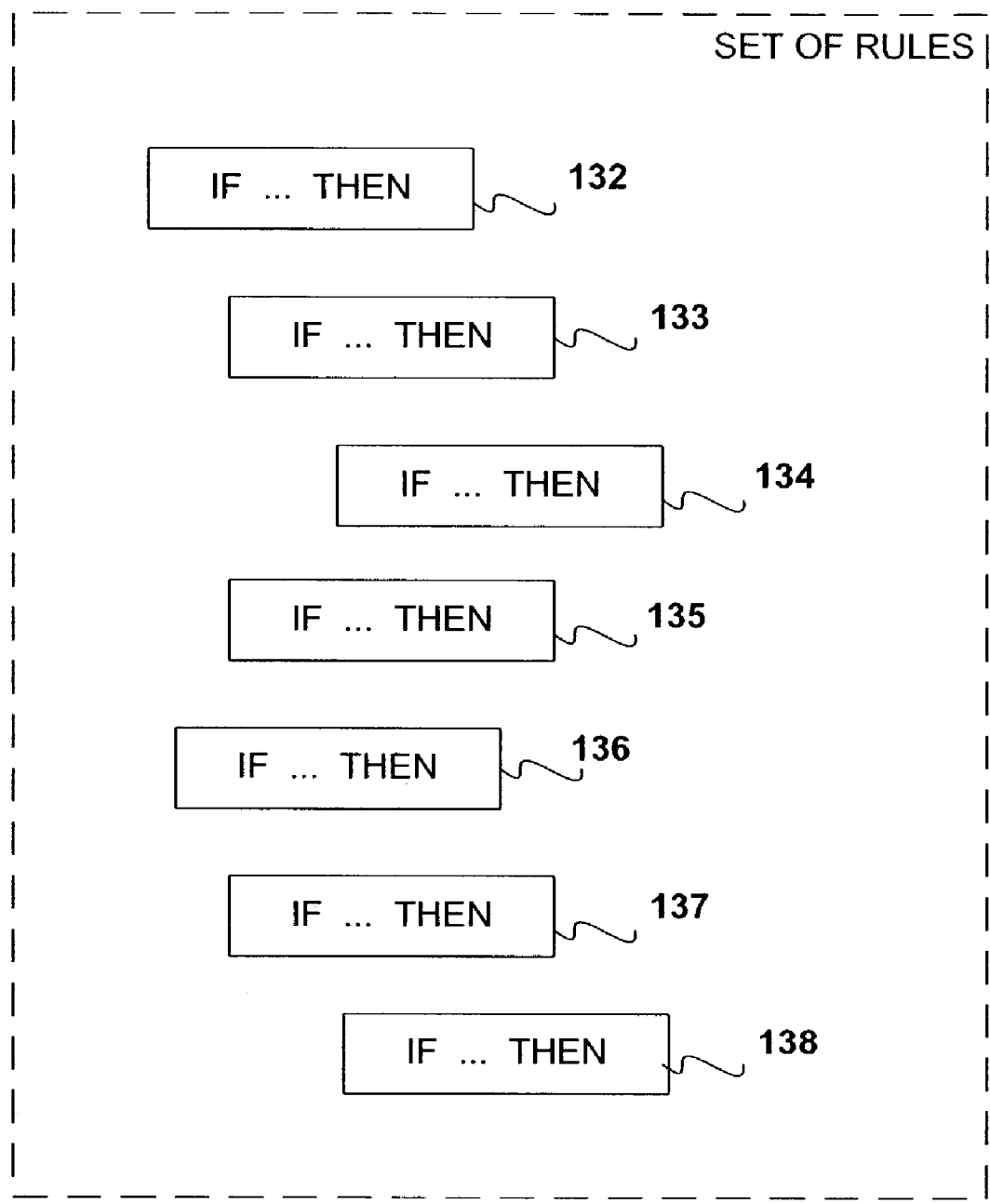
FIG. 7 is a diagram illustrating a rules-based system for determining context in accordance with an aspect of the present invention.

Referring to FIG. 7, a diagram illustrates an exemplary hierarchical ordered set of rules 130. The set of rules 130 depicts rules 132, 133, 134, 135, 136, 137 and 138, for example. It is noted that other rules may be similarly configured. As illustrated in FIG. 7, rules 133 and 134 are subordinate to 132, while rule 134 is subordinate to rule 133, and rule 138 is subordinate to rule 138. The rules are ordered in that rule 132 is first tested; if found true, then rule 133 is tested, and if rule 133 is found true, then rule 134 is tested, and so forth. If rule 133 is found false, then rule 135 is tested. If rule 132 is found false, then rule 136 is tested, which if found false, causes testing of rule 137, which if found true causes testing of rule 138. The rules are desirably user creatable and/or modifiable. Otherwise-type rules can also be included in the set of rules 130 (e.g., where if an if-then rule is found false, then the otherwise rule is controlling).

Thus, a set of rules can be constructed by the user such that the user's context is determined. For example, with respect to location, the set of rules can be such that a first rule tests whether the current day is a weekday. If it is, then a second rule subordinate to the first rule tests whether the current time is between 9 a.m. and 5 p.m. If it is, then the second rule indicates that the user is located in his or her office, otherwise the user is at home. If the first rule is found to be false—that is, the current day is a weekend and not a weekday—then an otherwise rule may state that the user is at home. It is noted that this example is not meant to be a restrictive or limiting example on the invention itself, wherein one or more other rules may also be similarly configured.

In the following section of the description, a determination of user context by inferential analysis, such as by employing a statistical and/or Bayesian model, is described. It is noted that context determination via inferential analysis can rely in some aspects on other determinations, such as direct measurement via sensor(s), as has been described. Inferential analysis as used herein refers to using an inference process(es) on a number of input variables, to yield an output variable(s), namely, the current context of the user. The analysis can include in one aspect utilization of a statistical model and/or a Bayesian model.

Figure 8:
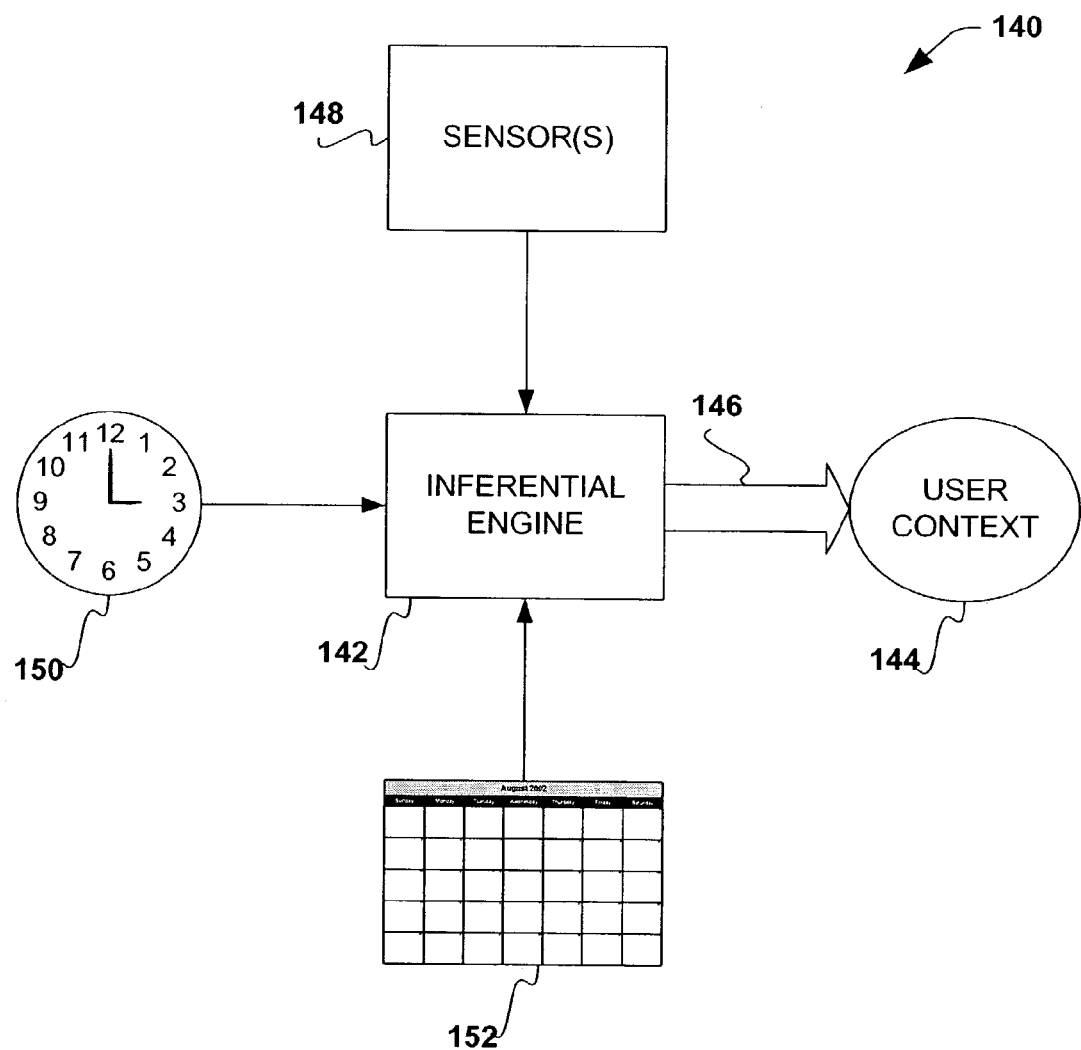
FIG. 8 is a schematic block diagram illustrating an inference-based system for determining context in accordance with an aspect of the present invention.

Referring to FIG. 8, a diagram of a system 140 is illustrated in which inferential analysis is performed by an inferential engine 142 to determine a user's context 144, according to an aspect of the present invention. The engine 142 is in one aspect a computer program executed by a processor of a computer from a computer-readable medium thereof, such as a memory. The user context 144 can be considered the output variable of the engine 142.

The engine 142 can process one or more input variables to make a context decision. Such input variables can include one or more sensor(s) 148, such as the sensor(s) that have been described in conjunction with a direct measurement approach for context determination in a previous section of the description, as well as the current time and day, as represented by a clock 150, and a calendar 152, as may be accessed in a user's scheduling or personal-information manager (PIM) computer program, and/or on the user's PDA device, for example. Other input variables can also be considered besides those illustrated in FIG. 8. The variables of FIG. 8 are not meant to be a limitation or a restriction on the invention itself.

Figure 9:
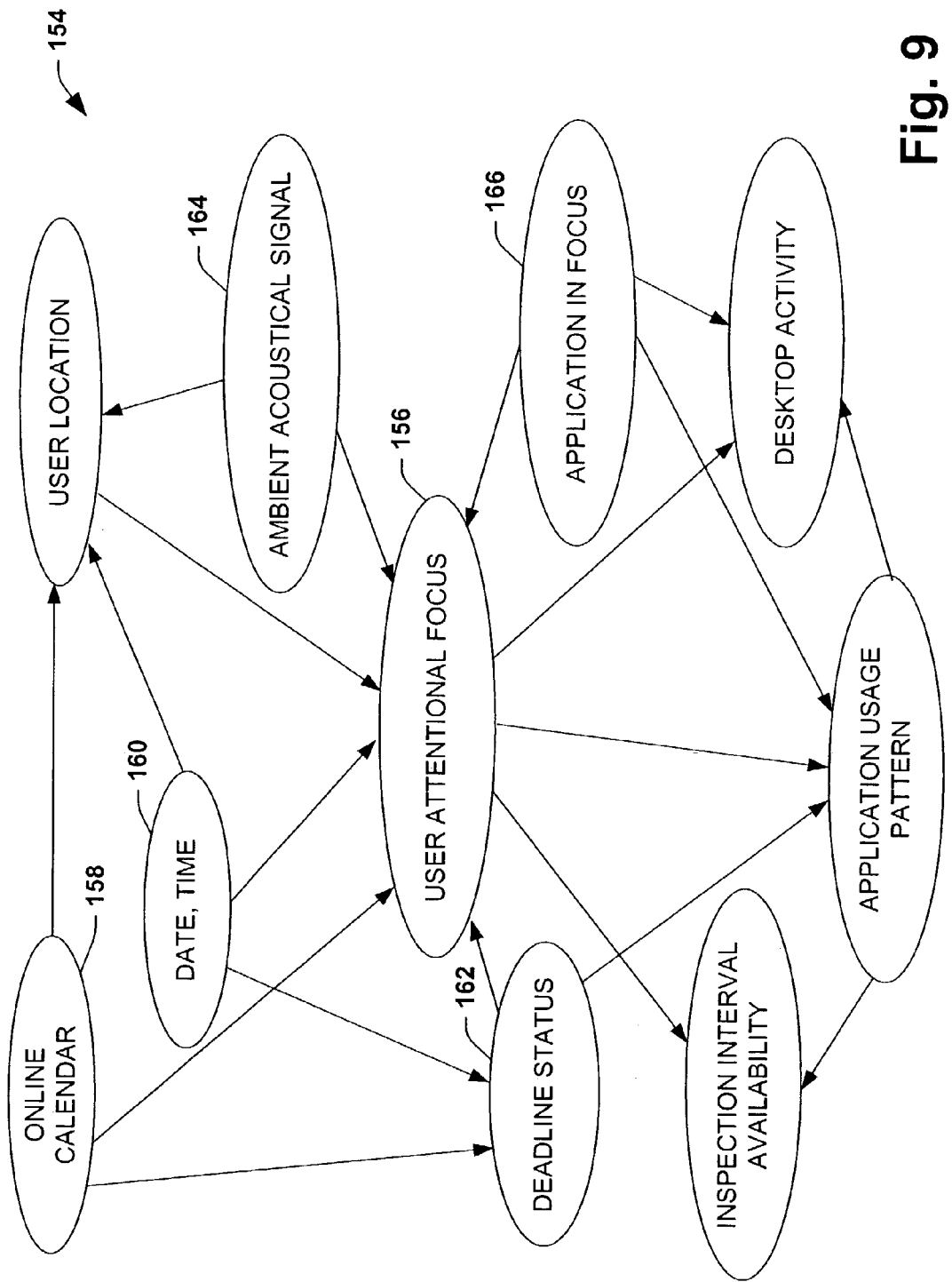
FIG. 9 is a diagram illustrating an inference model for determining context in accordance with an aspect of the present invention.
Figure 10:
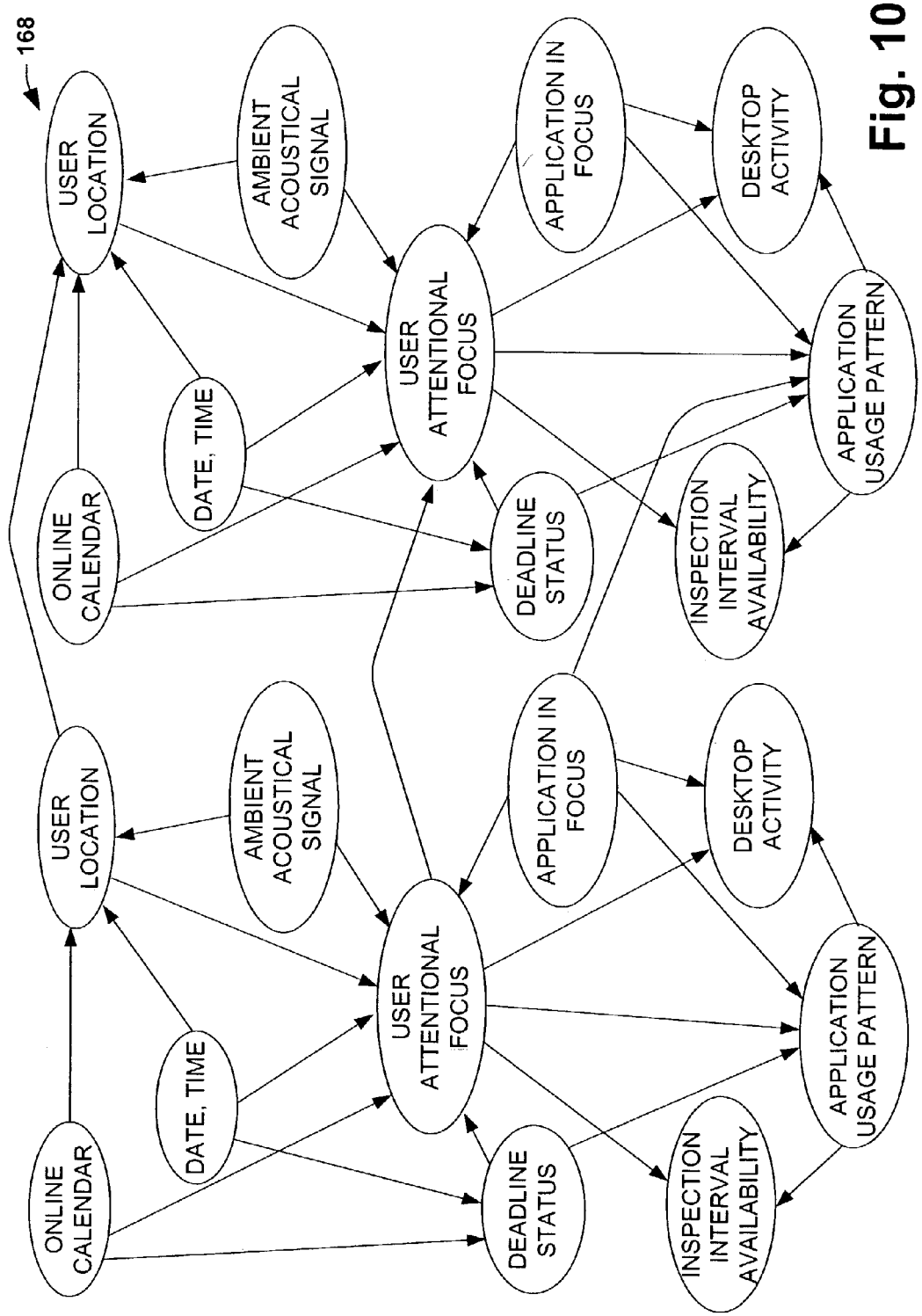
FIG. 10 is a diagram illustrating a temporal inference model for determining context in accordance with an aspect of the present invention.

Referring now to FIGS. 9 and 10, an exemplary inferential model, such as provided by a statistical and/or Bayesian model that can be executed by the inferential engine described above is illustrated in accordance with the present invention. In general, a computer system can be somewhat uncertain about details of a user's state. Thus, probabilistic models can be constructed that can make inferences about a user's attention or other state under uncertainty. Bayesian models can infer a probability distribution over a user's focus of attention. Such states of attention can be formulated as a set of prototypical situations or more abstract representations of a set of distinct classes of cognitive challenges being addressed by a user. Alternatively, models can be formulated that make inferences about a continuous measure of attentional focus, and/or models that directly infer a probability distribution over the cost of interruption for different types of notifications.

Bayesian networks may be employed that can infer the probability of alternate activity contexts or states based on a set of observations about a user's activity and location. As an example, FIG. 9 displays a Bayesian network 154 for inferring a user's focus of attention for a single time period. States of a variable, Focus of Attention 156, refer to desktop and non-desktop contexts. Exemplary attentional contexts considered in the model include situation awareness, catching up, nonspecific background tasks, focused content generation or review, light content generation or review, browsing documents, meeting in office, meeting out of office, listening to presentation, private time, family time, personal focus, casual conversation and travel, for example. The Bayesian network 154 indicates that a user's current attention and location are influenced by the user's scheduled appointments 158, the time of day 160, and the proximity of deadlines 162. The probability distribution over a user's attention is also in influenced by summaries of the status of ambient acoustical signals 164 monitored in a user's office, for example. Segments of the ambient acoustical signal 164 over time provide clues/inputs about the presence of activity and conversation. Status and configuration of software applications and the ongoing stream of user activity generated by a user interacting with a computer also provide sources of evidence about a user's attention.

As portrayed in the network 154, a software application currently at top-level focus 166 in an operating system or other environment influences the nature of the user's focus and task, and the status of a user's attention and the application at focus together influence computer-centric activities. Such activity includes the stream of user activity built from sequences of mouse and keyboard actions and higher-level patterns of application usage over broader time horizons. Such patterns include e-mail-centric and Word-processor centric, and referring to prototypical classes of activity involving the way multiple applications are interleaved.

FIG. 10 illustrates a Bayesian model 168 of a user's attentional focus among context variables at different periods of time. A set of Markov temporal dependencies is illustrated by the model 168, wherein past states of context variables are considered in present determinations of the user's state. In real-time, such Bayesian models 168 consider information provided by an online calendar, for example, and a stream of observations about room acoustics and user activity as reported by an event sensing system (not shown), and continues to provide inferential results about the probability distribution of a user's attention.

FIGS. 11, 12, 13, 15, 17 and 21 illustrate methodologies for providing portions of a notification architecture such as a context analyzer, a notification manager, and user interface in accordance the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

The methodologies can in some aspects be computer-implemented. A computer-implemented method is desirably realized at least in part as one or more programs running on a computer—that is, as a program executed from a computer-readable medium such as a memory by a processing system of a computer. The programs are desirably storable on a machine-readable medium such as a floppy disk or a CD-ROM, for distribution and installation and execution on another computer. The program or programs can be a part of a computer system or a computer, such as that described in conjunction with FIG. 23 below.

Figure 11:
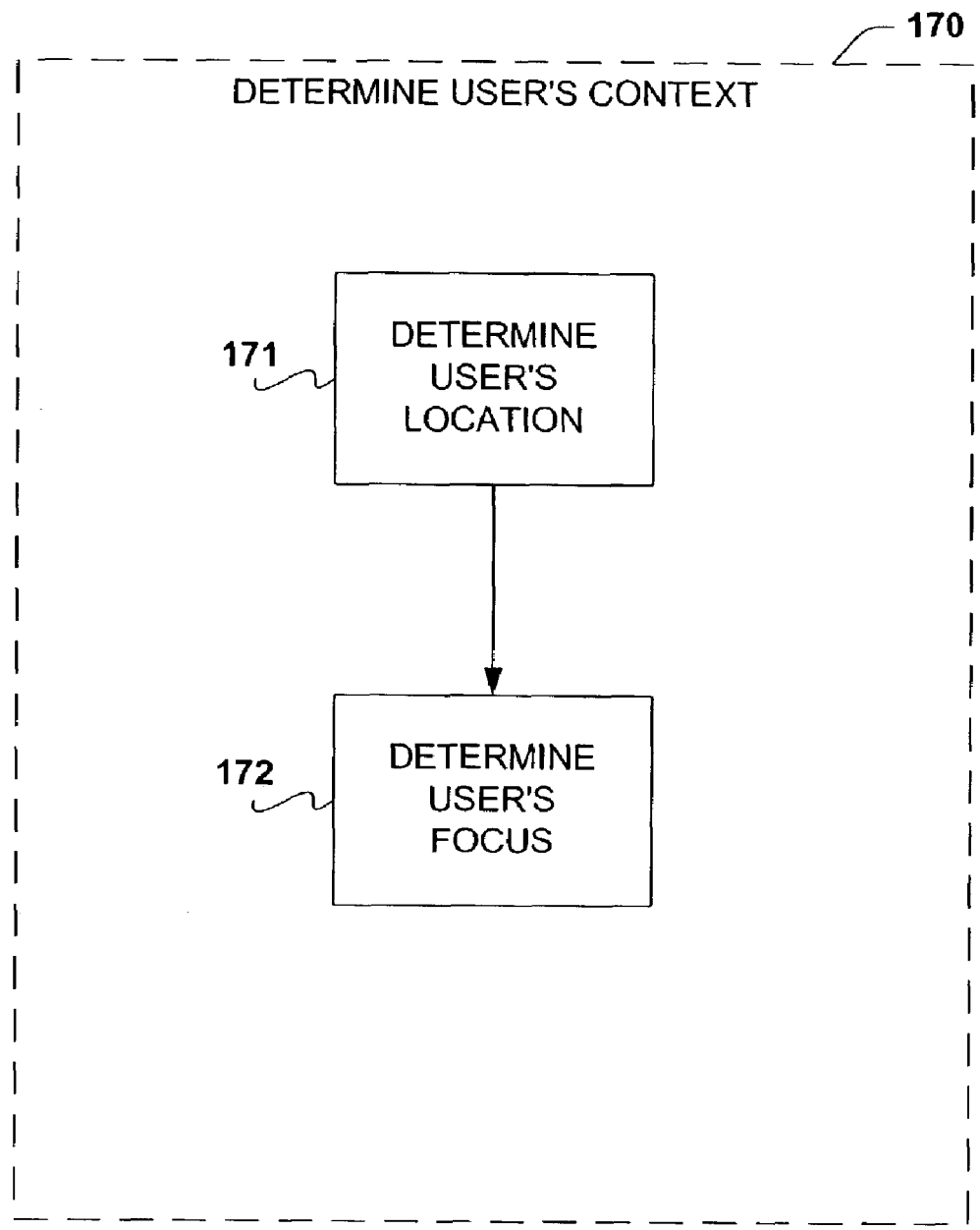
FIG. 11 is a flow chart diagram illustrating a methodology for determining context in accordance with an aspect of the present invention.

Referring to FIG. 11, a flow diagram 170 illustrates determining a user's context in accordance with the present invention. The process includes determining the user's location in 171, and the user's focus in 172. These acts can be accomplished by one or more of the approaches described previously. For example, a profile can be employed; a user can specify his or her context; direct measurement of context can be utilized; a set of rules can be followed; an inferential analysis, such as via a Bayesian or a statistical model, can also be performed. It is to be appreciated that other analysis can be employed to determine a user's context. For example, there can be an integrated video camera source that notes if someone is front of the computer and whether or not he or she is looking at the computer. It is noted, however, that the system can operate with or without a camera. For all of the sources, the system can operate with substantially any input source available, not requiring any particular source to inference about context. Furthermore, in other aspects, there can be integrated accelerometers, microphones, and proximity detectors on small PDA's that give a sense of a user's location and attention.

Figure 12:
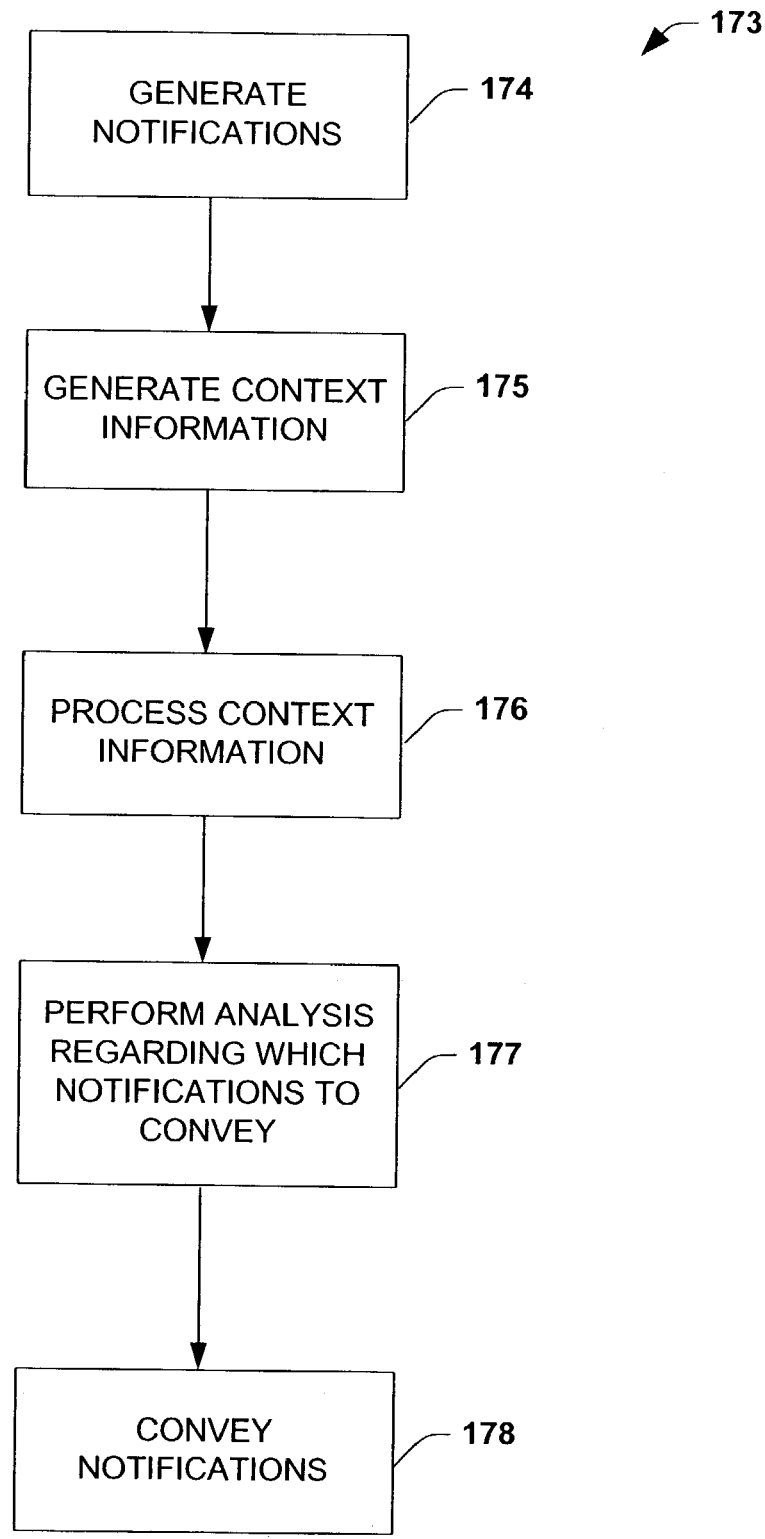
FIG. 12 is a flow chart diagram illustrating a methodology for notification decision-making in accordance with an aspect of the present invention.

Referring now to FIG. 12, a flow diagram 173 illustrates a decision process for a notification manager in accordance with an aspect of the present invention. At 174, one or more notification sources generate notifications, which are received by a notification manager. At 175, a context analyzer generates/determines context information regarding the user, which in 176 is received by the notification manager. That is, according to one aspect of the present invention, at 175, the context analyzer accesses a user contextual information profile that indicates the user's current attentional status and location, and/or assesses real-time information regarding the user's current attentional status and location from one or more contextual information sources, as has been described in the previous sections of the description.

At 177, the notification manager determines which of the notifications to convey to which of the notification sinks, based in part on the context information received from the context analyzer. The notification manager also makes determinations based on information regarding notification parameters of the user as stored by the context analyzer. That is, according to one aspect, in 177, the manager performs a decision-theoretic analysis as to whether a user should be alerted for a given notification, and how the user should be notified. As will be described in more detail below, decision-theoretic and/or heuristic analysis, determinations and policies may be employed at 177. Notification parameters regarding the user can be utilized to personalize the analysis by filling in missing values or by overwriting parameters provided in the schema of sources or sinks. Notification preferences can also provide policies (e.g., heuristic) that are employed in lieu of the decision-theoretic analysis. Based on this determination, the notification manager conveys the notifications to the sinks at 178.

Various aspects of the invention have been described herein thus far as applicable to users. However, the invention itself is not so limited. That is, the invention is applicable to substantially any type of entity, including users. Other types of entities include agents, processes, computer programs, threads, services, servers, computers, machines, companies, organizations, and/or businesses, for example. The agent, for example, may be a software agent, which can be generally defined as a computer program that performs a background task for a user and reports to the user when the task is done or some expected event has taken place. Still other types of entities are encompassed under the invention, as can be appreciated by those of ordinary skill within the art. For example, the context analyzer according to another aspect of the invention can be generalized as a component applicable to substantially any type of entity. As another example, notification sinks can generate notifications, alerts and events regarding entities other than users. Similarly, notification sinks can receive notifications, alerts and events regarding entities other than users.

Figure 13:
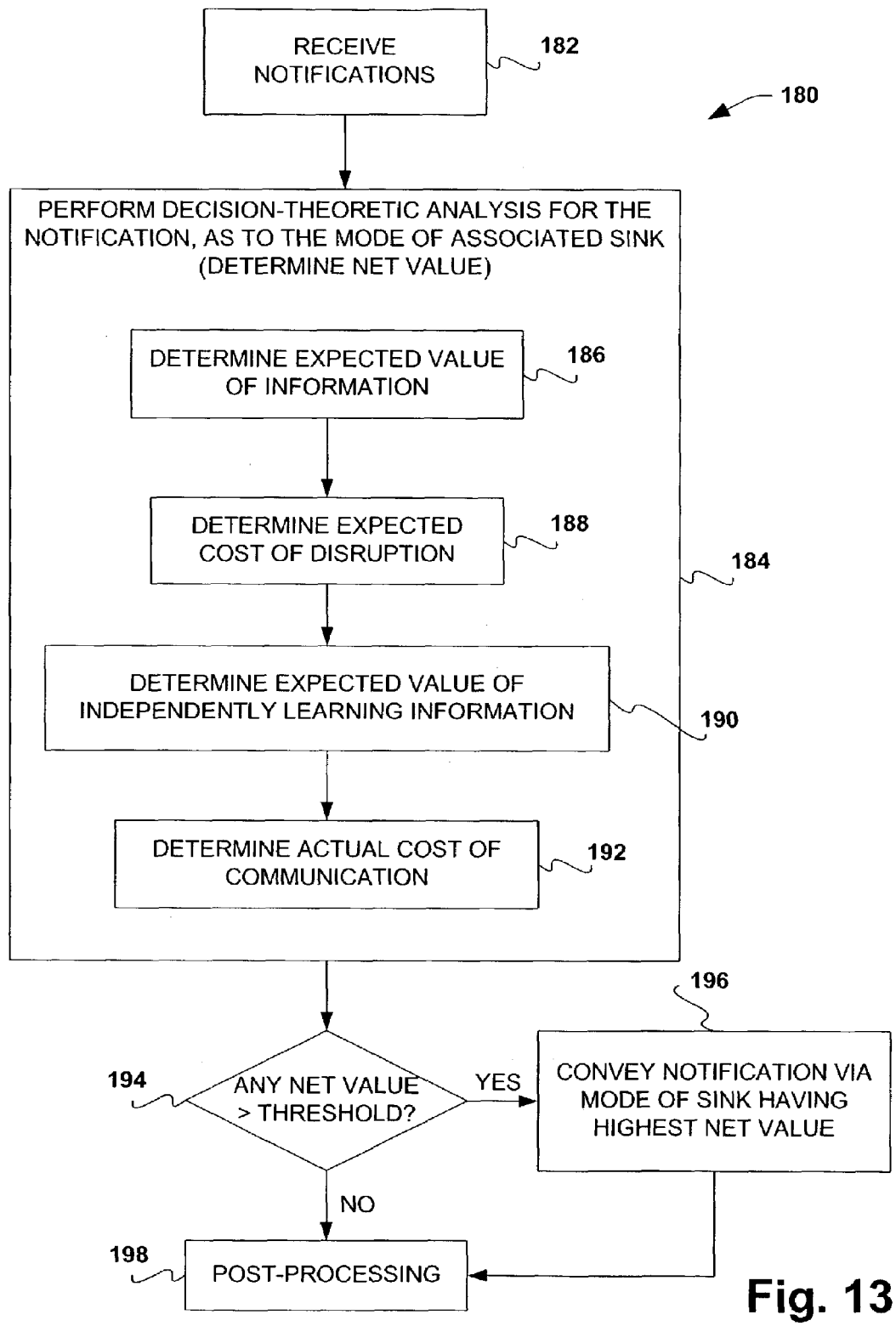
FIG. 13 is a flow chart diagram illustrating a methodology providing a decision-theoretic analysis for a notification platform in accordance with an aspect of the present invention.

Turning now to FIG. 13, a flow diagram 180 illustrates a decision-theoretic determination, as can be performed by a notification manager in accordance with an aspect of the present invention. At 182, one or more notifications are received. Notifications provide information that can be conveyed to a user, via a mode of an associated notification sink. At 184, a decision-theoretic analysis is performed for the notifications received at 182, over a number of modes of a number of sinks. The analysis desirably results in a net value of conveying the notification via the modes associated with the sinks. Analysis can be performed utilizing a probabilistic model, such as a Bayesian network.

According to one aspect of the present invention, determining the net value of conveying notifications according to the modes of the sinks at 184 involves performing 186, 188, 190, and 192 of FIG. 13. At 186, an expected value of the information contained within the notification to the user is determined. This is the value of the information that results to the user if he or she is notified. At 188, an expected cost of disruption of conveying the notification to the user is determined. This is the cost of disrupting the user to convey the notification—for example, the user may be busy in a meeting, such that disrupting the user with a notification results in a cost to the user. At 190, an expected value of the user independently learning the information contained in the notification, without actually being conveyed the notification, is determined. This value can be less than the value determined in 186, since the user may learn the information independently at a later time than if he or she would be notified to the information. At 188, an actual cost of communicating the notification to the user is determined. For example, sending a message via a pager may result in a communication charge being incurred by the user from the user's pager company, wherein such pages are charged by the company on a per-page basis.

The net value of conveying notifications to the user via the modes of the sinks can be determined at 184 by subtracting from the expected value of information determined in 186, the expected cost of disruption determined in 188, the expected value of the user independently learning the information in 190, and the actual cost of communication in 192. At 194, it is determined whether the net value for substantially any mode of substantially any sink is greater than a predetermined conveyance threshold. For example, where the net value is measured in dollars ($), the predetermined conveyance threshold may be zero. If the net value of notification is greater than the threshold for the modes of the sinks, then the process proceeds to 196 for such notifications, wherein such notifications are conveyed to the user via the mode of the sink having the highest net value for the notification. Otherwise, for those notifications not having net values greater than the threshold for substantially any mode of substantially any sink, the user is not currently notified of the information contained in such notifications, and the process proceeds to 198 for such notifications, to perform post-processing, to which the process also proceeds from 196 as well.

The invention is not limited by the manner by which post-processing is performed at 198. According to one aspect of the invention, notifications that were conveyed in 196 to the user, assuming that 196 was performed, can be deleted. In another aspect, such notifications are deleted upon receiving confirmation that the user has in fact received the notification, from the notification sink to which the notifications were conveyed. The notifications can also be deleted after conveyance if it has been determined that the notification sink to which the notification was conveyed has a transmission reliability for the mode of the sink utilized greater than a threshold value. Furthermore, it is noted that the process of FIG. 13 can be repeated at predetermined intervals, and/or as new notifications are received. For example, inasmuch as the net value of a notification as determined in 184 is time-dependent, a given notification that may have a net value less than the conveyance threshold now may have a net value greater than the threshold later, such that it is then conveyed. An alternative situation can also be true. Thus, the process depicted in FIG. 13 illustrates the manner by which decision-theoretic analysis can be performed to determine whether notifications should be conveyed to the user via a mode of a sink, such that the analysis can be repeated as desired.

It is noted that the process depicted in FIG. 13 has been described as to the performance of a decision-theoretic analysis for a notification over a number of modes of a number of notification sinks. However, the invention itself is not so limited. For example, there may implicitly be only one such mode for any or all of the sinks. In this manner, the analysis for a notification is performed over the sinks, without explicit regard to the mode. Furthermore, as has been noted, the determination of the net value of the notification as to the mode of the sink can be performed as is described in the next section of the description.

According to one particular aspect of the present invention, a decision-theoretic notification as presented in previous sections of the description can be performed as is described in the following section, although the invention is not so limited. For example, an iterative "greedy" decision-theoretic analysis can be employed. During the analysis, the current context and associated expected value of transmitting an alert are considered. Less approximate, more precise decision-theoretic analyses that perform inferences about the future, that consider a range of future times, contexts, and associated expected values can utilize such models as dynamic Bayesian networks, or approximations of dynamic Bayesian networks referred to as Hidden Markov models (HMM's). Such techniques can be employed to make notification decisions based on less "myopic" analyses that "forecast" the context at future states. Within the art, generalizing myopic analyses to richer, less myopic analyses is known. For a notification platform, these "less greedy" analyses employ additional quantities of computation. A notification manager in one aspect is configured that can shift into less myopic modes based on a consideration of the computation that is now available, or that will be available, per monitoring the status of available computational resources. That is, the invention is not limited to the greedy approach described. Less approximate, less greedy optimizations of ideal time and device for notifications can consider a range of future contexts and associated availabilities of devices, by forecasting the likelihood of these contexts and device availabilities.

The expected value of a notification N at time t is can be considered the current value of the notification. The informational value of a notification is considered as being sensitive to the context and to the knowledge of the user. The context includes such contextual information as the location and attentional status of the user, the goals of the user, and the context (e.g., did the user just open e-mail). The initial value of a notification N in a context C is the value (as, for example, can be measured in dollars) of the notification in the context when the notification is first generated by a source, diminished by the probability that the user is not already familiar with the information. The probability that the user is not familiar with the information is referred to as the novelty of the information. This probability is based on such evidence E as the type of information and the manner the information is distributed (e.g., a news story becomes known via other channels over time and thus the evidence can include the salience and the age of a news story).

If the value of information when it is already known to be zero is considered, the value of a notification is:

$$\text{ValInfo}(N_i) = p(\text{novel}|E) \times \text{value}(N_i, t_o) \quad (1)$$

The notion of context-specificity can be introduced by conditioning the value on a context C, and assessing the value based on a context:

$$\text{ValInfo}(N_i) = p(\text{novel}|E) \times \text{value}(N_i, C_j, t_o) \quad (2)$$

At some new time t, the value of transmitting the notification may change based on the time-dependency of the value:

$$\text{ValInfo}(N_i) = p(\text{novel}|E) \times \text{value}(N_i, C_j, t) \quad (3)$$

A value function can be represented by time-dependent functions that take as arguments the difference of time or delay between the time an alert is sent or received by the notification manager, and the current time, wherein delay is expressed as $t - t_0$. Such functions may include, for example, linear, exponential, and sigmoidal functions that indicate the loss of value delay. More complex functions include concatenations of linear, exponential, and sigmoidal functions, such as functions that represent a "shelf life" which refers to the period of time following the time an alert is sent or received where the value does not change, before the value of the information begins to change (e.g., begins to decay). Other functions can capture the notion that an alert can become more valuable with some amount of delay.

According to one aspect of the invention, the fact that the context can also change and be different at a new time is considered. Thus, equation (3) can be rewritten with C(t), or the context can be stated as always being the current context. Under uncertainty in the context, the different potential contexts are summed over. Thus, the expected value of the information is:

$$\text{ExpValInfo}(N_i) = p(\text{novel}|E) \Sigma_j \text{value}(N_i, C_j, t) p(C_j|E) \quad (4)$$

This is the value of the user receiving the full content of the notification at some time t in context C.

The expected value of communicating the information with mode M of a device is diminished by the loss of fidelity associated with the rendering and consideration of whether the information has been transmitted to the user when signaled with the mode M in context C. It can be assumed for sake of simplicity that the fidelity of the transmission is captured as a variable ranging between zero, for no transmission of the content, to one, for the full transmission of the content. According to other aspects of the present invention, more detailed utility models are considered that capture additional details of the losses of dropping one or more components of the initial content, and the truncation and summarization of the content in various manners (e.g., the truncation by some total percentage of the full text of an email message—or another approach to summarization— into a smaller, more compact message for display on a limited cell phone display). In the general case, the fidelity associated with the transmission of the information over mode M of a device is dependent on the context; for example, it may be hard to hear the audio portion of audio content in a noisy environment.

The probability that the information has been transmitted to the user may also be considered. This, in the general case, is also dependent on the context. As this dependency is typically more salient than the context-dependency of the fidelity, this can be specified explicitly. Transmission of the information as a probability that the user has received the information is represented as p(received|M,C,E,e), wherein e represents additional evidence about a user's response to a notification, such as a pause, mouse over, interaction, for example.

Next, the expected value of communication of the notification is determined as $$\text{ExpValCom}(N_i, M_k) = p(\text{novel}|E)\text{fidelity}(M_k)\Sigma_j\text{value}(N_i, C_j, t)p(\text{received}|M_k, C_j, E, e)p(C_j|E) \quad (5)$$

It is noted that the expected value of the communication in equation (5) is written in terms of the expected value of the information of the notification. This is similar to $$\text{ExpValCom}(N_i, M_k) = \text{ExpValInfo}(N_i)\text{fidelity}(Mk)\Sigma_j p(\text{received}|M_k, C_j, E, e)p(C_j|E) \quad (6)$$

The expected value of communication as embodied in equations (5) and (6) can in one aspect be employed as the expected value of the information to the user as described in the previous section of the description. Alternatively, the expected value of information can be the expected value without consideration of the fidelity and other parameters—that is, as $\text{ExpValInfo}(N_i)$. The invention is not limited to these approaches, however.

Next, the cost of the information is considered. The cost associated with the disruption depends on the mode of the transmission and the context, mostly via the attentional context of the user. The expected cost of disruption of the user for each context can also be measured in dollars in one aspect, equal to the amount a user would be willing to pay to avoid the disruption associated with the transmission of the information via mode M. In the general case, this can also be dependent on the details of the content being transmitted. According to one aspect, however, the different costs under the uncertainty of the context are specifically considered. Thus, an expected cost of disruption for a mode M is $$\text{ExpCostDisrupt}(M_k) = \Sigma_j|\text{CostDisrupt}(M_k, C_j)p(C_j|E) \quad (7)$$

The value of signaling a user now with a notification via mode M is the difference between the value and the cost of the information. The dollar cost of the actual communication, such as the cost of transmitting the bits, for example, per the fees charged by a service, is also considered. This can be a function of the notification content and the mode selected. This is also referred to as the (actual) communication cost, ComCost(N,M).

Next, it can be considered that the (net) value is not zero if the user is not actively signaled with a notification, but that the user may receive the information later when he or she is free to review the information or actively seek the information from a store, such as an e-mail store, or for general purposes, a store of potential notifications that is maintained until the user has an opportunity to review them. This is referred to as the expected value of seeking the information contained within the notification, ExpValSeek, referred to in the previous section of the description as the expected value of the user independently learning the information without notification. The value can be determined by considering the time until a user will review the information contained in the notification. This time is typically context sensitive, as, for example, the time until a user seeks information from such a store can depend on the location, time of day, and the current focus of attention. It is considered that the novelty of the information may change and may be a function of the amount of time that the notification has been pending. For simplification, the fidelity can be considered full when the user seeks the information—however, in the general case, the user may be seeking the information through a device that provides lower fidelity. It can also be assumed that the cost of disruption associated with seeking the information is about zero, as the user will be in an attentional state to actively pursue the information.

Thus, $$\text{ExpValSeekInfo} = \Sigma_{tseek} p(t_{seek}|E)p(\text{Novel}, t_{seek}|E)\Sigma_j\text{Value}(N_i, C_j, t_{seek})p(C_j|E, t_{seek}) \quad (8)$$

It is noted that there are several approaches for implementing and determining equation (8) with respect to determining the latency between the time of a notification and the time until seek. In one aspect, it can be assumed that t is distributed with a Poisson distribution and that the time of seeking is the (memory less) mean time until a user reviews the notification store from the time of the analysis. Latency can be determined as the difference between that time and the time of the notification. Furthermore, a Bayesian network or other probabilistic model can be utilized to infer a probability distribution over the different mean times to review an email, or a more general notification store. A Bayesian network or other probabilistic model can also be employed to determine the probability distributions over the user's attentional focus, location, as described above.

Thus, the net expected value of the communication of the notification, NetExpValCom for communicating notification N with mode M is:

$$\text{NetExpValCom}(N_i, M_k) = \\ \text{ExpValCom}(N_i, M_k) - \text{ExpCostDisrupt}(M_k) - \\ \text{ExpValSeekInfo}(N_i) - \text{ComCost}(N_i, M_k) \quad (9)$$

This is what has been referred to as the net value in the previous section of the description.

For decision-making, for notifications coming in the NetExpValCom for substantially all modes M of substantially all devices are considered. The device that has the largest positive NetExpValCom is considered (that is, assuming a predetermined conveyance threshold of zero dollars, as this term is expressed in the previous section of the description). If the NetExpValCom is positive for more than one device (e.g., notification sink), the device with the highest value is selected and signals the user with that device. If the value is negative for substantially all modes of substantially all devices, notification can be deferred, and may be journaled for later review. The value of rendering the notification continues to be reconsidered in one aspect, but by updating variables that change with time. These include the current time, the expected time until the user reviews his or her email, or, more generally, his or her notification store, and such variables as current context and novelty of the information. Such reconsideration can be performed as part of the post-processing as has been described in the previous section of the description.

It is noted that this iterative reasoning about now versus later is the type of decision-theoretic analysis that is performed in a particular aspect of the invention. It is a greedy decision making-strategy. However, less greedy strategies can be formulated that rely on somewhat more complex forecasting models that consider the values and costs of an active notification at future times. For example, a probabilistic model can be employed to forecast future attentional states of the user and such forecasts can be utilized in reasoning in an increasingly less greedy of a manner.

Furthermore, even after signaling a single time, in some aspects the notification is not immediately discarded (viz., deleted). For example, it cannot be typically assured that the notification has gotten through to the user, once it is rendered. Such assurance is possible, however, if the system has a process in place such as a shared understanding between user and system that, for example, the user causing a cursor to hover over the rendered notification in a desktop scenario is the manner by which for the user to indicate to the system, "yes, I got this," or by automatically monitoring the access of the notification in some other way. An example of the latter is monitoring whether a user has examined the message on his or her cell phone. The reporting of such monitoring can be the confirmation of notification receipt as noted in the previous section of the description.

The modes of the sinks are considered as having a context-sensitive transmission reliability (also referred to as transrel) of the mode in that context, transrel(M,C). That is, for the mode, and for the context, the transmission reliability gives the probability that a user has observed the notification based on that rendering. As has been noted, at times, confirmation that transrel has been 1.0 can be received—for example, with an interaction with a notification or with a mouse over of a notification, such that a user has observed the notification with probability 1.0. At other times, the transmission reliability for the mode and the context can be relied upon.

The likelihood that the user has received the information p(receive) for each notification is updated after each transmission. $H^A(N_i)$ refers to the alerting history of a specific notification that has been pending in a general, internal in-box. The alerting history indicates a sequence of attempted notifications, wherein $$H^A(N_i): \{A_1(N_i,M,C), A_2(N_i,M,C), A_3(N_i,M,C), \ldots A_n(N_i,M,C)\} \quad (10)$$

$A(N_i,M)$ refers to an alert about notification $N_i$ with mode M. Given a notification history, the current notification novelty, $p(\text{notification unseen}|H^A,E,e)$, can be determined. Including this factor appropriately diminishes the expected value of seeing the notification.

More specifically, first, an updated ExpValCom and ExpValSeek are $$ExpValCom(N_i, M_k) = \quad (11)$$
$$p(novel|E)fidelity(M_k) \times p(\text{notification unseen}|H^A, E) \times$$
$$\sum_j value(N_i, C_j, t)p(received|M_k, C_j, E, e)p(C_j|E)$$

$$ExpValSeekInfo = \quad (12)$$
$$p(\text{notification unseen}|H^A, E, e) \times \sum_{t_{seek}} p(t_{seek}|E)$$
$$p(Novel, t_{seek}|E) \times \sum_j Value(N_i, C_j, t)p(C_j|E, t_{seek})$$

Next, NetExpValCom is determined in a similar manner as before, but with these new ExpValCom and ExpValSeekInfo values. Thus, $$NetExpValCom(N_i, M_k) = \quad (13)$$
$$ExpValCom(N_i, M_k) - ExpCostDisrupt(M_k) -$$
$$ExpValSeekInfo(N_i) - ComCost(N_i, M_k)$$

Additionally, the notification novelty, $p(\text{notification unseen}|H^A,E,e)$, generally is updated. According to one aspect of the present invention, this can be determined after new attempts at an alert (notification renderings, or conveyance of a notification) is made, by considering attempts as a Bernoulli trial, for example, as is now described. Given an alerting history, $$H^A(N_i): \{A_1(N_i,M,C(t_1)), A_2(N_i,M,C(t_2)), A_3(N_i,M,C(t_3)), \ldots A_n(N_i,M,C(t_n))\},$$

the notification novelty is $$p(\text{notification unseen}|H^A, E, e) = \quad (14)$$
$$[1 - p(received\ A_1|M, C(t_1), E, e_1)] \times$$
$$[1 - p(received\ A_2|M, C(t_2), E, e_2)] \times$$
$$\ldots \times [1 - p(received\ A_n|M, C(t_n), E, e_n)]$$

It is also noted that notifications can be chunked—that is, grouped together for transmission as a grouping of notifications via a given mode of a given notification sink—by considering notification sets that include a set of concurrent notifications.

$$NetExpValCom(N_i, M_k) = \quad (15)$$
$$\left[\sum_{i=1\ldots n} ExpValCom(N_i, M_k) - ExpValSeekInfo(N_i) - ComCost(N_i, M_k)\right] - ExpCostDisrupt(M_k)$$

Thus, a summation of the value and costs of notifications are considered, wherein the penalty of one disruption is contemplated.

In this section of the description, various extensions to the aspects of the invention described in the preceding sections are presented. First, it is noted that decision-theoretic policies may be compiled and/or approximated into simpler rules and policies in one aspect. This can utilize formal methods for compiling such decision-theoretic analyses into policies. Furthermore, there are a variety of policies such as heuristic policies, for example, that perform a coarser cost-benefit analysis, as described in more detail below.

Moreover, decision-theoretic policies can be utilized for situations of "pulling information." That is, when a user requests information from the system, including requests during desktop as well as in mobile situations, the cost of distraction to be zero is considered, and information can be related about the next most valuable notification to send to the user. Such information can be ordered by next most valuable, or can be grouped for cognitive purposes into categories. For example, the next "n" most valuable notifications can be examined, such that a command is related to stream the notifications in this order, or to wait for a request for "next notification" in order of expected utility.

Alternatively, information can be related in terms of categories of sources, based, for example, in the order of the source containing a notification with the highest expected utility. Relaying notifications can continue within the source category until reaching a threshold of expected value before moving onto the source containing a notification with the next highest value, and the process is then repeated. Alternatively, information can be relayed by a predefined sequencing of sources (e.g., voicemail messages first, followed by instant messages, followed by e-mail, and then by financial notifications), and then relaying notifications from each of the sources, sorted by expected utility within the category, until reaching a threshold in expected utility for that category and then proceeding on.

The expected value of information can be utilized to tailor high-level summaries of the current situation. For example, there can be reasoning across sources to build a text-to-speech summary of pending notifications for communication of the current notification situation over cell phones. In addition, the expected value determinations can be utilized to accomplish caching. The expected value determinations can also be utilized to inform speech recognition systems to listen better, by assuming users will be most interested in the highest expected value items, to, for example, enhance dialog in mobile and desktop settings.

Furthermore, another extension of the invention that has been described is that the set of expected values within source categories can be employed to tailor summaries. Such summaries may appear in a persistent summary for relaying overviews of the status of notifications for each source. For example, an e-mail summary could be like the following example: "32 unread messages; 9 of high urgency; most urgent from Andy on 'Meeting this afternoon.'"

Heuristic communications determinations and policies, as can be performed by the notification manager are now described in accordance with the present invention. For example, a coarse cost-benefit analysis can be harnessed that bypasses more formal decision-theoretic analyses. Such policies and associated notification components and interfaces can be viewed as approximate or heuristic versions of the decision-theoretic policies. In this approach, notifications can be labeled as high, normal, and low urgency (or any range of urgencies) by a source—or by a user-specified notification profile (e.g., per attributes of the message and/or the message class). A list of conditions can be created as to when the user would likely be in a state to receive notifications and perform coarser monitoring of context to identify situations wherein the user would likely be available to receive notifications with minimal disruption. These states are called "likely free" states.

This list can include one or more of the following (and other states):

User has been present and typing and has just paused typing for x seconds.

User has just saved a file and pauses for x seconds

User has just sent an email and pauses for x seconds

User has just closed an application

User has just switched from one application to another

Also, a max deferral time can be set for the urgency level. For example, internally, an exemplary table can be set as follows:

Max deferral (High priority): 2 minutes

Max deferral (Normal priority): 7 minutes

Max deferral (Low priority): 15 minutes

This can be set by users, or, alternatively, by system developers for default operation that may or may not be modified by users.

Additionally, a user can list exceptions or emergencies as receiving immediate pass-throughs, for example.

Below is an exemplary algorithm per an aspect of the invention:

When a notification is received, its age is set to zero, its priority is noted, and the list of exceptions is checked.

If a free state is observed via monitoring the user's activities before the max deferral time for that urgency, the notification is passed through to the user.

Else, the notification is relayed when the max free state is reached for the notification.

On average, most notifications generally will be delivered before the max deferral times. However, users typically will be happier as they will tend to occur when the user is freer than they would have been had notifications simply been passed through when notifications are received. Thus, the probability that a free state will be reached increases with time. As the probability of there being a likely free state increases with increasing amounts of times, lower priority messages will tend to occur with higher-likelihood during these likely free states, and the probability of being disrupted will grow with the increasing priority of the messages.

This approach can be generalized as follows: According to one aspect, the display of notification can be enabled to include multiple, or pooled notifications that have been waiting, so as to send to the user a single notification that contains chunks of grouped notifications. Such chunking can present chunks of notifications in lists ordered by max priority, max age, or max priority by group, for example. For example, if a likely free state has not been seen and that max deferral time has been reached by a high priority notification, at the time the max deferral has been reached for the high priority notification, information is included about the lower priority notifications that are pending in a grouped notification. This is though the lower priority notifications may not have reached their own max deferral at this time.

Additionally, instead of a few categories of priority a continuous range can be enabled, for example, 0-100, for an urgency score and have the max deferral be a function of the priority of the notification, including a variety of linear and nonlinear functions (e.g., exponential decay of max deferral time with increasing priority). For example:

$$\text{max deferral(priority)} = e^{-k(priority)} \times 15 \text{ minutes}$$

or $$\text{max deferral(priority)} = e^{-k(priority)} \times \text{max deferral(0 priority)}$$

The probability of free time can be learned within the next x minutes for a user. This can be achieved by learning the frequency of likely free states and the expected time until the next likely free state. The expected time until the next likely free state can be determined from a user's activity and automatically set the max deferral times for notification priority classes so as to enable users to specify instead of a max deferral time, a probability for the priority class that the user will be disturbed. That is, users can specify a target "tolerated probability" of disruption for the priority class and the system can set the max deferral times for the classes. That is, users (or, alternatively, system developers, by default) configure a notification system in a manner such as, "I will tolerate a probability of 0.5 of being disrupted for a high priority notification, a 0.25 chance of being disturbed with a normal priority message, but a 0.05 chance of being disturbed with a low priority notification, for example.

Figure 14:
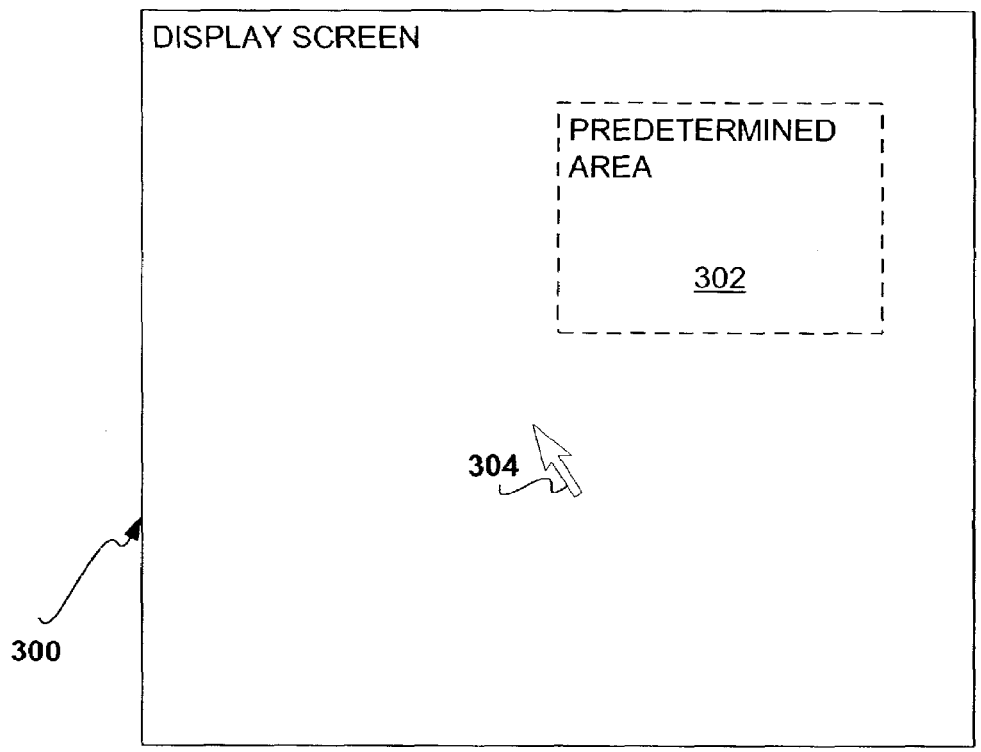
FIG. 14 is a diagram illustrating an exemplary display in accordance with an aspect of the present invention.

Below, an overview of user interface(s) according to aspect(s) of the present invention is illustrated. An example of such an interface is depicted in the diagram of FIG. 14, wherein a predetermined area 302 (e.g., for displaying an output and/or providing for user interaction) within a desktop screen 300 of a display of a computer (e.g., laptop computer, desktop computer, or other display) is provided. As illustrated in FIG. 14, the predetermined area 302 is in the upper right-hand of the screen 300, however, it is to be appreciated that other areas of the screen may be employed (e.g., lower left, right). For example, in a stream-stacking aspect of the invention described later in the description, the area 302 can be a column on the right-hand of the screen 300. The screen 300 is desirably such that a user can control movement of a cursor 304 thereon, as is employed with a graphic users interface. The cursor 304 as illustrated in FIG. 14 is an arrow pointer, however, it is to be appreciated that other cursors can be employed.

The predetermined area 302 can be utilized in connection with displaying information in conjunction with various aspects of the present invention. As used herein, information can refer to a singular piece of information, and/or a plurality of information. According to one aspect of the present invention, the information comprises notification alerts, also referred to as alerts or notifications, as has been described supra. Thus, various aspects of the present invention are directed to the display of such information within the predetermined area 302 of the desktop screen 300 as described infra. In one aspect, the desktop screen 300 can be employed by a user for a primary task—for example, working on a word processing document, a spreadsheet workbook, or other application.

The information displayed within the area 302 can be unrelated to the primary task, however. As an example, the information displayed may be information not requested by the user. For example, the information may alert the user to an e-mail, such that the user, while having requested the e-mail over a predetermined classification threshold (e.g., information classified according to importance) be conveyed to him or her, has not requested (also referred to as "un-requested") that the e-mail be displayed in the area 302.

The screen 300 can be part of a display that is able to provide generalized rendering, including, for example, content formatted in accordance with HyperText Markup Language (HTML) format. Furthermore, multiple sources of information are able to send "rich" interfaces, including buttons, links, animations, audio, and so forth. (e.g., for source branding), such that the information is rendered within constraints and higher-level design conventions or style conventions of the user interface described herein. However, the invention itself is not so limited.

In the following sections of the description, a pulsing aspect of the invention, a stream-cycling aspect of the invention, and a stream-stacking aspect of the invention are described. These are particular aspects by which information can be displayed in the predetermined area 302 of the desktop screen 300, for example. It is noted that the following sections depict at least one example of these aspects, however, the invention itself is not limited to these examples. Furthermore, there can be combinations of a pulsing mode, a stream-cycling mode, and a stream-stacking mode wherein the user is able to switch among the modes. For example, a system can include a display, a processing system, and a machine-readable medium storing a computer program executed by the system to cause entry into one of the modes.

Alternatively to the user switching among the modes, in one aspect, a notification manager, as has been described above, can perform switching decisions, for example. The user or the notification manager can in one aspect also make a decision as to switch-able features within a given mode, such as within the pulsing, the stream-cycling, and/or the stream-stacking mode. The presence or absence of audio heralds can also in one aspect be a decision delegated to the user and/or the notification manager.

Figure 15:
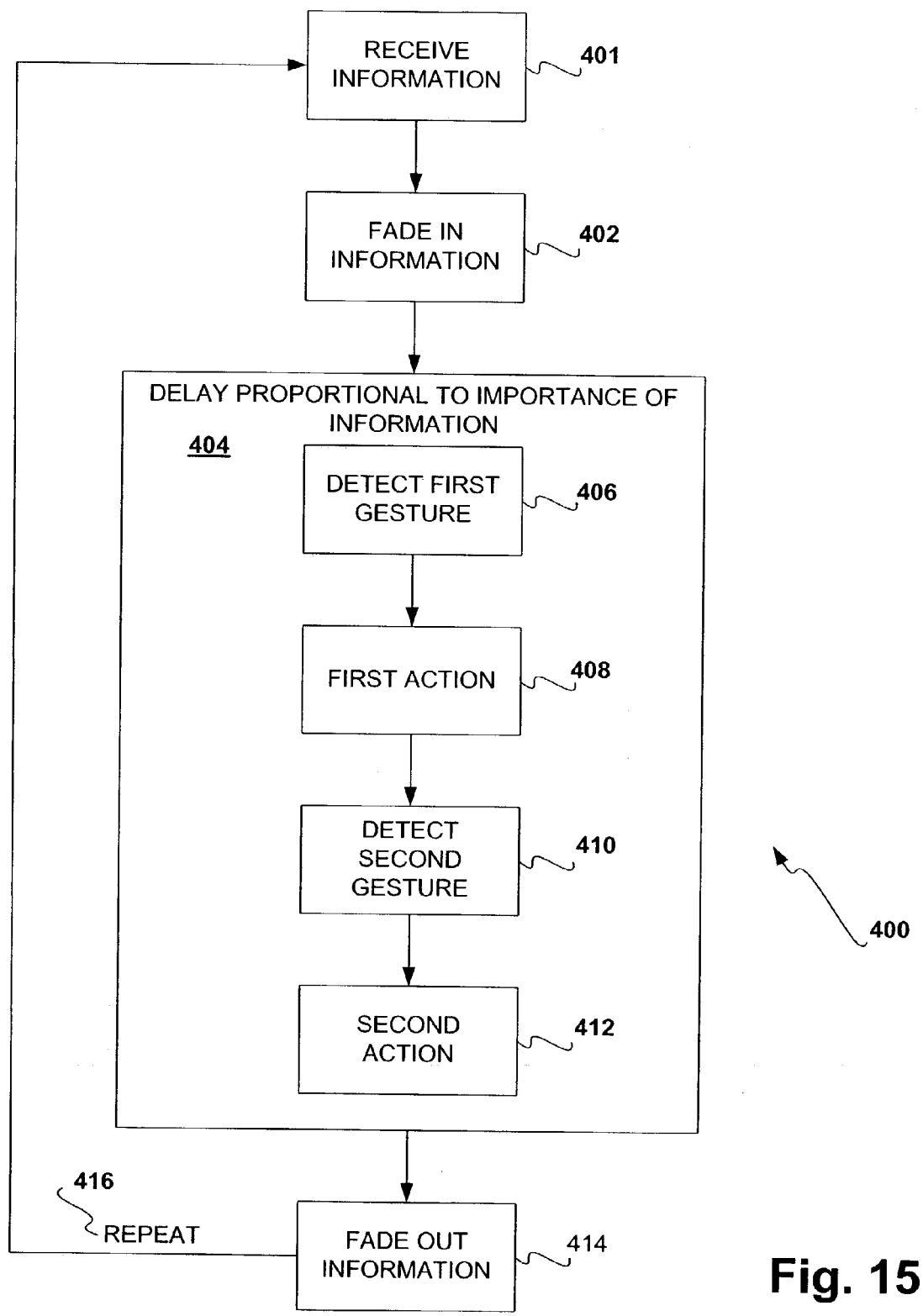
FIG. 15 is a flow chart diagram illustrating a methodology providing a variable display in accordance with an aspect of the present invention.

Referring now to FIG. 15, a flow diagram of a method 400 of a pulsing aspect is illustrated in accordance with the present invention. At 401, information is received. As has been described, the information may be un-requested information that is not related to a primary task of the user. The information can include a notification alert, for example, having an assigned classification, such as an importance value associated therewith greater than a threshold, such as defined by a predetermined threshold. The measure of the importance value is not limited by the present invention, nor the threshold.

At 402, the information is faded into the predetermined area of a display. In one aspect, the information is faded in by displaying the information in the predetermined area and increasing an alpha value (e.g., intensity value associated with display pixels) of the information as displayed in the predetermined area to a first predetermined level, at a given rate. The first predetermined level can be based on the importance of the information as defined by an importance value. For example, the level can be proportional to the information's importance. Increasing the alpha value of the information increases the opacity of the display of the information in the predetermined area. Thus, increasing the alpha value to a level based on the importance of the information means that more important information is displayed with a greater opacity—that is, with less translucency—than less important information. In one aspect, however, the predetermined level is less than 100%—that is, it is less than 100% opacity. Furthermore, an audio herald to alert the user to the information faded into the predetermined area can also be played at 402. The audio herald can be a predetermined sound or sounds, wherein the importance value of the information can be associated with various aspects of the sound (e.g., volume higher or lower based on importance, more or less sounds based on importance).

At 404, there is a delay for a length of time based on the importance of the information. For example, the length of time can be proportional to the information's importance. The delay is thus desirably the length of time that the information will be displayed to the user. Thus, information with a greater importance can be displayed longer than information with a lesser importance. In one aspect, during the length of time delayed, 406, 408, 410 and 412 of the process 400 are performed, although the invention itself is not so limited.

At 406, a first predetermined user gesture relevant to the fading of the information into the predetermined area of the display is detected. For example, this first gesture can be the movement of the cursor over the predetermined area of the display (e.g., by a user causing such movement via utilization of a pointing device such as a mouse), although the invention itself is not so limited. Another gesture can include particular speech or voice by the user that is detected. In response to the first gesture, in 408, a first action is performed. In one aspect, the action includes increasing the alpha value of the information as displayed in the predetermined area to a second predetermined level greater than the first predetermined level, such as 100%. The first gesture thus can cause the information to become more opaque. In another aspect, more detailed information (e.g., as related to an alert) is displayed in the predetermined area of the display at 408, in response to the first gesture.

At 410, a second predetermined user gesture relevant to the fading of the information into the predetermined area of the display is detected. For example, this second gesture can be the movement of the cursor to an area of the display such that the cursor is no longer over the predetermined area of the display (e.g., by a user causing such movement via utilization of a pointing device such as a mouse or keyboard movement). Another gesture is particular speech of voice by the user that is detected. In response to the second gesture, in 412, a second action is performed. The action can include decreasing the alpha value of the information as displayed in the predetermined area back to the first predetermined level, from the second predetermined level it was previously adjusted to in 408. According to another aspect of the invention, the more detailed information that may have been displayed in the predetermined area of the display in 408 is replaced by the information as was previously faded thereto in 402.

At 414, when the delay of 404 has passed, the information is faded out from the predetermined area of the display. For example, in one aspect this involves decreasing the alpha value of the information as displayed in the predetermined area at a given rate, and then not displaying the information in the predetermined area any longer. The process depicted in 400 can be repeated, as indicated by 416. That is, new information can be received in 401, which may have a new importance, such that the new information is faded into the predetermined area of the display in 402. It is noted that in one aspect, the fading in and out of the information into the predetermined area is such that whatever was already displayed on the predetermined area stays there, as can be appreciated. That is, the information faded into the predetermined area is displayed on top of whatever is already there—the level to which the alpha value of the information faded in is increased thus determines how translucent or opaque the information faded in is, and thus how much of the information can be observed by the user. The information (although not fully propagated within the space) can be observed in partiality.

The process described in FIG. 15 is referred to as a pulsing aspect since information is "pulsed" to a determined alpha for a determined length of time associated with the classification (e.g., importance value) of an alert or notification. This is illustrated by reference to FIG. 16, in which a diagram 500 of such a pulse 502 is illustrated, according to an aspect of the present invention. The pulse 502 has a height 506 representing the alpha value level to which the information as displayed in the predetermined area is increased, a length 504 representing the length of time at which the information is displayed in the predetermined area at this alpha value level, a first slope 508 representing the rate at which the information is faded to this alpha value level, and a second slope 510 representing the rate at which the information is faded from this level. In one aspect, the height 506 and the length 504 are based on the importance of the information being pulsed (e.g., in one aspect, such that the height is proportional to the importance value). In one aspect, the slope 508 and/or the slope 510 is constant, although the invention itself is not so limited; furthermore, the slopes 508 and 510 can be similar to one another.

In one aspect of the present invention, there is a tab, button, and/or other item on the display that enables the user to immediately cause the display of the next notification by selecting this item. For example, clicking on a button indicates that the user wants to see the next notification, even if this notification has not reached the importance value or threshold for display on its own. Such a notification, for instance, may not have an importance greater than the threshold for independent display.

Figure 17:
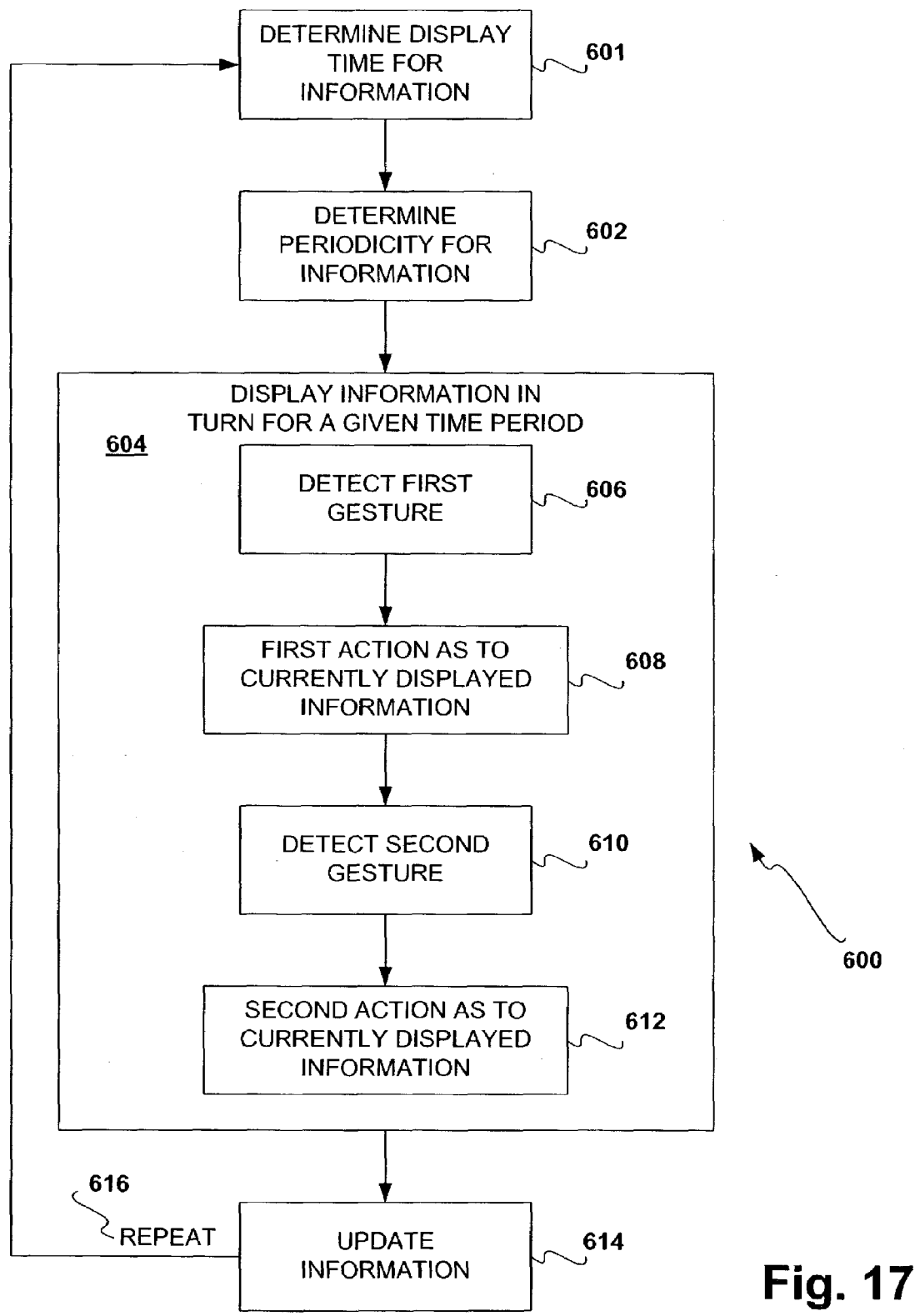
FIG. 17 is a flow chart diagram illustrating a methodology providing stream-cycling in accordance with an aspect of the present invention.

Turning now to FIG. 17, a flow diagram illustrates a methodology 600 of a stream-cycling aspect in accordance with the present invention. At 601, a respective number of different information packets (e.g., information associated with a notification or alert from a notification source) have an associated display time determined. The display time for an information packet is the length of time at which this information will be displayed in the predetermined area of the display. In one aspect, the length of time is based on the importance of the information, wherein respective information packets are assigned an importance value. For example, the display time may be proportional to the importance, although the invention is not so limited. Furthermore, as has been described, the information may be un-requested information unrelated to a primary task of the user. The information can include a notification alert.

At 602, in one aspect (that is, 602 is optional), a periodicity is determined for respective information packets. The periodicity for the information packet is the number of times that the information will be displayed in the predetermined area of the display over a given time period. For example, the periodicity can be based on classification(s) and displayed according to a predetermined protocol (e.g., proportionality associated with the classification(s)). In one aspect, the periodicity is based on the importance of the information; for example, it may be proportional to the importance value. Thus, more important information may be displayed more often than less important information during the given time period. In the aspect of the invention wherein 602 is not performed, respective information packets may have a periodicity about equal to one—that is, each information can be displayed one time for the given time period.

At 604, for a given time period, respective information packets are displayed in the predetermined area of the display a number of times about equal to its periodicity, for a length of time about equal to its display time. Thus, a first information packet can be displayed, then the second information packet, and so forth, until substantially all the information has been displayed during this given time period. In one aspect, respective information can be faded into and then out of the predetermined area, with a delay in-between about equal to the display time, as has been described in the previous section of the description (e.g., by raising the alpha value, delaying, and then lowering the alpha value). According to such an aspect of the invention, a first predetermined level to which the alpha value of an information packet is increased can be based on the information's importance, as has also been described. That is, the alpha value is ultimately set to the first predetermined level for a length of time about equal to the display time. In one aspect, an audio herald to alert the user to respective information displayed is also played, or alternatively for information exceeding a threshold, such as a predetermined threshold. The audio herald can be a predetermined sound or sounds as described above. In one aspect, during the given time period (to which the invention is not particularly limited), 606, 608, 610 and 612 of the process 600 are performed, although the invention itself is not so limited.

At 606, a first predetermined user gesture relevant to a current information packet being displayed in the predetermined area of the display is detected. For example, the first gesture can be the movement of the cursor over the predetermined area of the display (e.g., by a user causing such movement via utilization of a pointing device such as a mouse). Another gesture can include particular speech or voice by the user that is detected and/or processed. In response to the first gesture, in 608, a first action is performed. In one aspect, the action includes "holding" the current information being displayed in the predetermined area, such that substantially no other information is displayed in the predetermined area until the second gesture is detected in 610.

That is, effectively the display time of the currently displayed information is temporarily increased, and the given time period is increased, for a length of time equal to that length of time during which the current information is held in the predetermined area—until the second gesture is detected in 610. In another aspect, the first action performed in 608 includes increasing the alpha value of the current information as displayed in the predetermined area to a second predetermined level greater than the first predetermined level, such as 100%, for example. In such aspect, the first gesture thus causes the current information displayed to become more opaque. In another aspect, more detailed information (e.g., as related to an alert) is displayed in the predetermined area of the display in 608, in response to the first gesture.

At 610, a second predetermined user gesture relevant to the current information being displayed in the predetermined area of the display is detected. For example, this second gesture can be the movement of the cursor to an area of the display such that the cursor is no longer over the predetermined area of the display (e.g., by a user causing such movement via utilization of a pointing device such as a mouse). Another gesture is particular speech of the user that is recognized. In response to the second gesture, in 612, a second action is performed. In one aspect, the second action includes the "releasing" of the current information previously being "held" in the predetermined display area, such that subsequent information can continue to be displayed in turn in the predetermined area. The action can include decreasing the alpha value of the information as displayed in the predetermined area back to the first predetermined level, from the second predetermined level it was previously increased or set to in 608. In another aspect, the more detailed information that may have been displayed in the predetermined area of the display in 608 is replaced by the information as was previously displayed in 602.

At 614, once the given time period in which substantially all the information has been displayed in 604 has elapsed, the information is updated. For example, 614 can include adding new information, and deleting old information. Deletion of information may, for example, be based on the lowest priority information, information that has already been displayed a predetermined number of times, and so forth. Similarly, the new information that is added can include that for which the importance exceeds a predetermined threshold relating to the importance of the information. The process 600 of FIG. 17 is then repeated, as indicated by 616. Thus, in 601, a new display time for the respective information packets as has been updated is determined.

The aspects of the invention as described in conjunction with the process 600 of FIG. 17 is referred to as stream-cycling since information is "streamed"—a first piece of information is displayed in the predetermined area, then a second piece, and so forth, over the given time period. This is illustrated by reference to FIG. 18, in which a diagram 700 of a stream-cycling wheel 702 is illustrated, according to an aspect of the present invention. The wheel 702 has a number of slots 1 through N, N being an integer, 704-708. The slot 704, for example, corresponds to an instance of a portion of information being displayed during a given time period. Respective slots have a time delay corresponding to how long the portion of information is displayed during the given time period. For example, the slot 706 has a time delay represented by the length of the arc 710, wherein slots with longer arcs have greater corresponding time delays. Respective information is allocated to a number of slots about equal to the periodicity of the information. Thus, information with a periodicity of one is allocated to one slot. It is noted that the number of slots and the given time period can both be dynamic, such that when the information is updated, the number of slots can increase and decrease about equal to the sum total of the periodicities of substantially all the information, and such that the given time period over which substantially all the instances of the information are displayed can be about equal to the sum total of the time delays of the instances.

Figure 18:
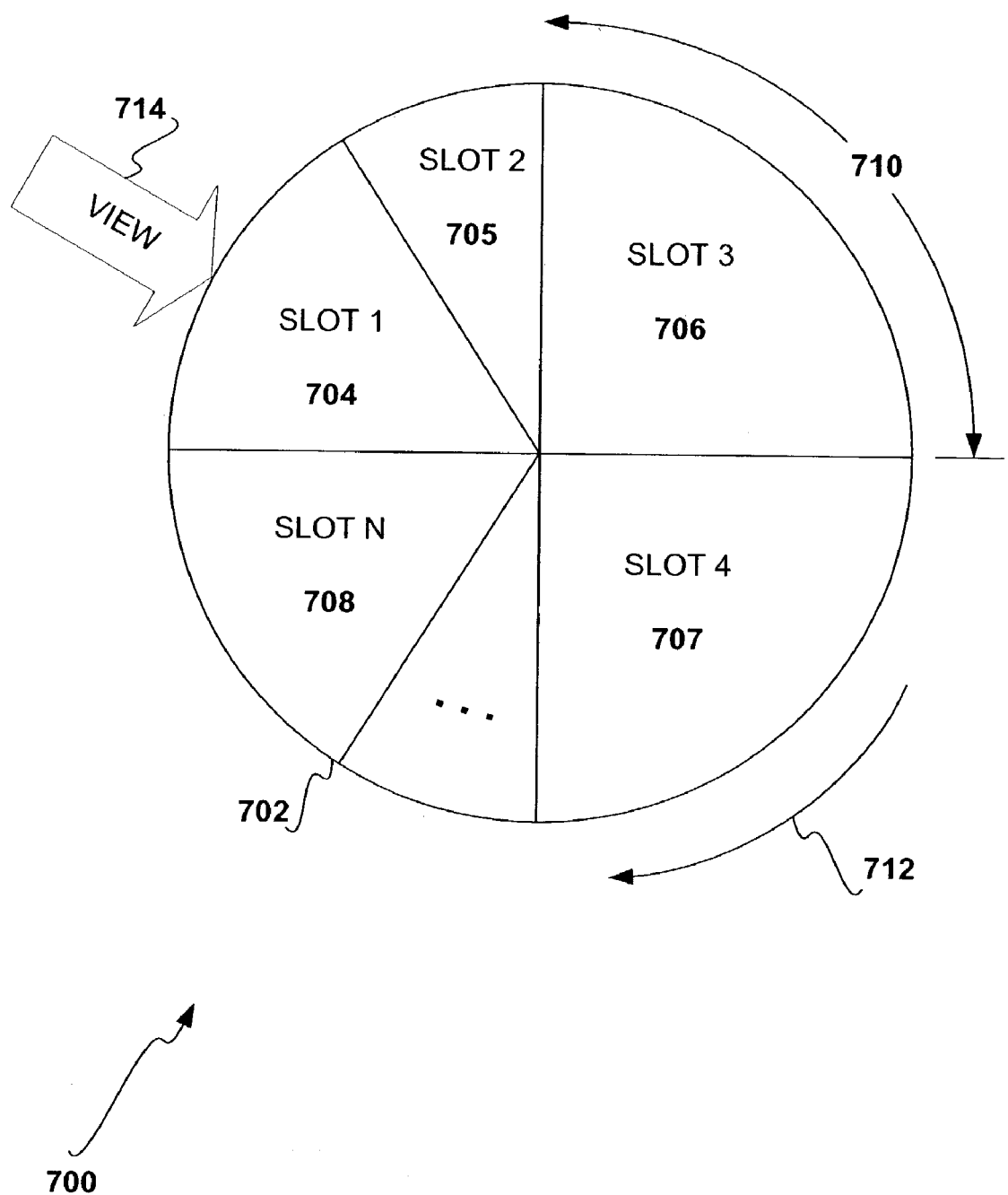
FIG. 18 is a diagram illustrating an exemplary stream-cycling display in accordance with an aspect of the present invention.

The wheel 702 turns, as indicated by the arrow 712, such that a viewing arrow 714 pointing to the wheel 702 points to different slots of the wheel 702 over the given time period. The slot 704 to which the arrow 714 is pointing contains the information that is to be currently displayed in the predetermined area of the display. Thus, as the wheel 702 turns during the given time period, different slots are pointed to by the arrow 714, such that different information is displayed in the predetermined area. The turning rate of the wheel 702 is such that the wheel 702 can perform one complete rotation over the given time period. It is noted that the wheel 702 of FIG. 18 is a conceptual view of the stream-cycling aspect of the invention, and that in actuality such a wheel does not have to be provided to implement this aspect.

According to one aspect of the present invention, one portion of information that can be stream-cycled is a summary page, which is information that contains a high-level summary of the most critical notifications in a current cycle, or, more generally of greater amounts of information as might be drawn from a larger notification store. Selection of a particularly referenced notification within this summary by the user causes the immediate display of the notification. In one aspect, there is more than one summary page, wherein respective pages can contain clusters of sets of information, including related information that is chunked—for example, a summary page for substantially all communications (e.g., instant messages, e-mail, incoming telephone calls), and/or a summary for substantially all automated services. Furthermore, in accordance with another aspect of the invention, there can be explicit sets of controls that enable the user to stop the cycling of information, to click rapidly through the cycle and pause wherein he or she desires to pause, and/or to drill down for other information. In one aspect, the information presented by stream-cycling can be displayed on a separate display.

Figure 19:
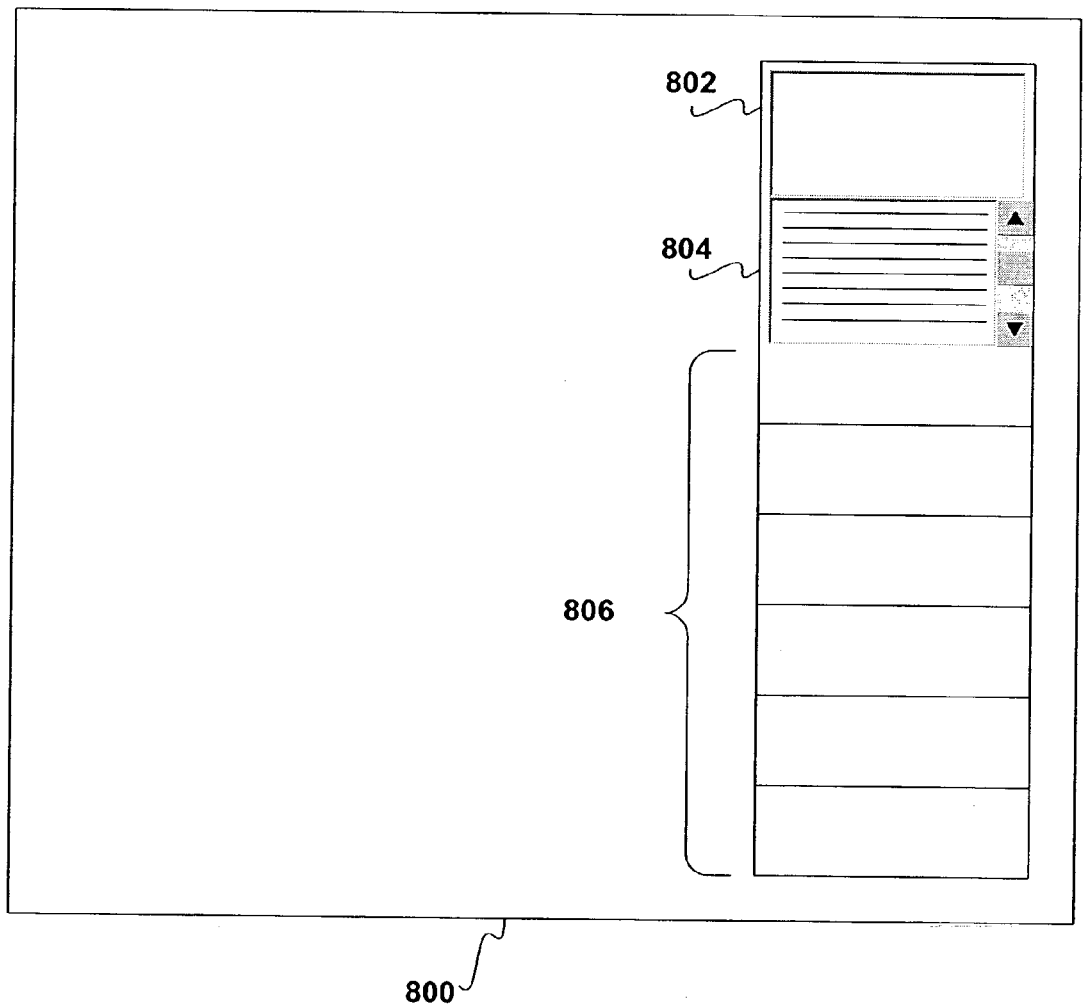
FIG. 19 is a diagram illustrating an exemplary stream-stacking display in accordance with an aspect of the present invention.

In the following section of the description, a stream-stacking aspect of the present invention is described. The diagram of FIG. 19 illustrates a display 800 according to such a stream-stacking aspect. The display 800 includes a main notification window 802, a journal window 804, and a number of source summary windows 806, substantially all of which are said to be displayed in a predetermined area of the display 800 (e.g., a screen thereof). There is a number of information sources, such as the notification sources as have been described previously. Respective information sources generate information, such as un-requested information that can include information unrelated to a primary task of the user as has been described, and displays the information in a corresponding source summary window 806. As has also been described, the information can comprise a notification alert.

Respective portions of information can be assigned an importance value, the measure of which is not limited by the invention. For example, information that has an importance greater than a threshold, such as a predetermined threshold, is displayed in a stream-cycling manner in the main notification window 802. For example, the stream-cycling can be in accordance with the stream-cycling aspect of the invention that has been described, wherein respective information is faded into the main notification window 802 for a length of time, and then faded out. However, the invention itself is not so limited. Displaying the information in a stream-cycling manner is also referred to herein as display-streaming the information. As displayed in the main notification window 802, the information may be a more detailed version thereof than that which is displayed in one of the source summary windows 806, in one aspect.

Furthermore, in one aspect of the present invention, information that has been display-streamed in the main notification window 802 is journaled in the journal window 804, according to a predetermined criteria. For example, when a particular portion of information has been displayed in the main notification window 802, a one-line summary of the information can be added to the journal window 804, referred to herein generically as a journal entry, such that the window 804 displays a list of such summaries. The list of the window 804 in one aspect is scrollable by the user, so that the user is able to examine substantially all the information that has already been display-streamed in the main notification window 802.

According to one aspect of the present invention, the predetermined criteria limiting the information that is journaled, and/or added, to the journal window 804 is information that has not been indicated by the user as having been viewed by him or her. For example, the user can indicate that information currently being displayed in the main notification window 802 has been viewed by him or her by performing a predetermined user gesture, such as causing movement of a cursor over the main notification window 802, which is also referred to as hovering. The predetermined criteria for journaling can also be user controlled. In general, the journal is employed to capture the full history of attempts to relay information to a user. A journal entry may include the source of the information, a high-level title and/or summary, and/or information about actions that may have been undertaken with respect to the notification or alert.

An action can be performed in response to a predetermined user gesture relevant to the information being displayed in the main notification window 802, the source summary windows 806, and/or journaled in the journal window 804. For example, the predetermined user gesture can be causing movement of a cursor over the main notification window 802, the source summary windows 806, or a journal entry in the journal window 804, and selecting the information displayed therein. Selecting can be caused by the user by clicking a suitable input device button, although the invention is not so limited. The action performed in response to this gesture is not limited by the invention. However, in one aspect, the action includes displaying further information, such as more detailed information, related to the information that has been the subject of the relevant gesture.

Figure 20:
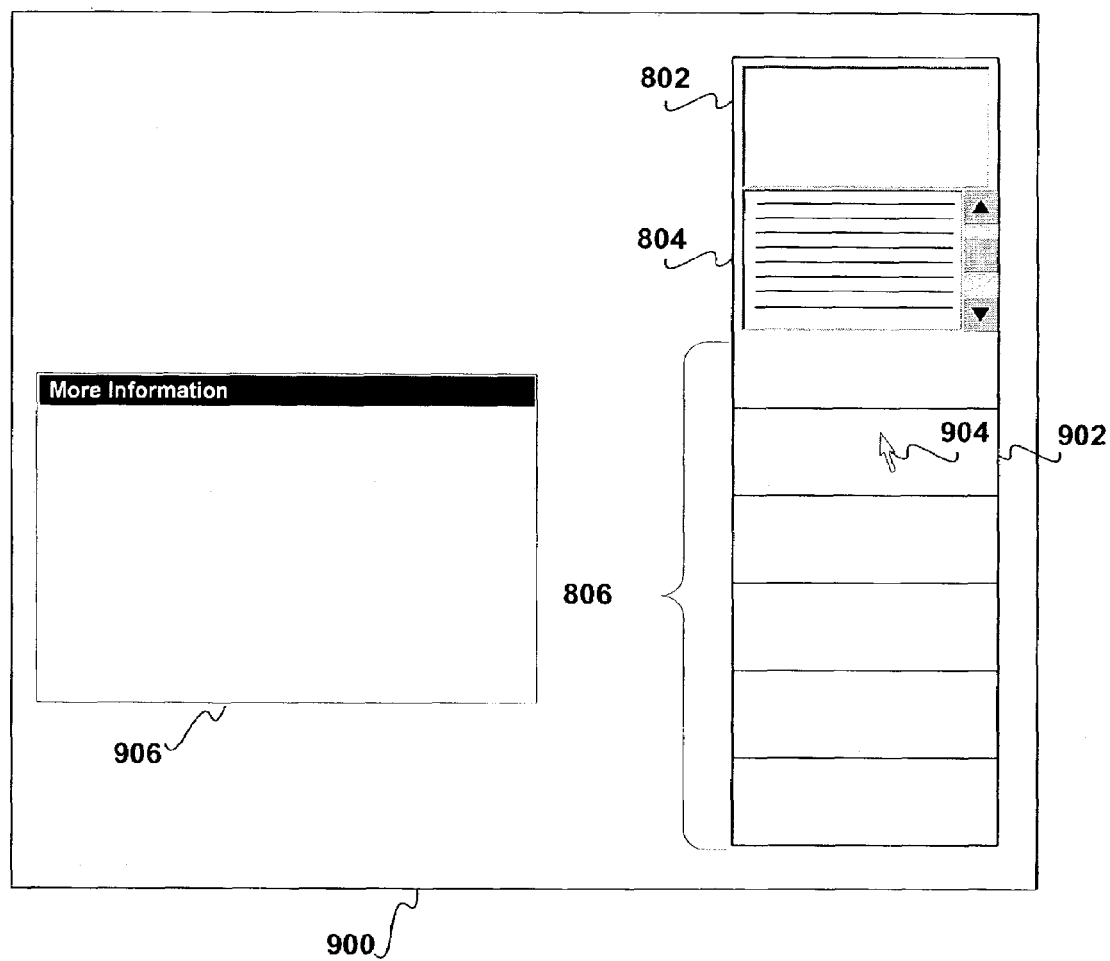
FIG. 20 is a more detailed diagram illustrating an exemplary stream-stacking display in accordance with an aspect of the present invention.

An example of this is depicted in the diagram of FIG. 20. In a display 900, the user has caused movement of the cursor 904, illustrated in FIG. 20 as a pointer although the invention is not so particularly limited, over a source summary window 904 of the source summary windows 806, and is assumed to have selected the information being displayed in the source summary window 904. The source of information for the window 904 is referred to as a user-desired source, since it is the source that the user has performed a gesture relevant thereto. In response to the gesture, an action has been performed, specifically, the display of a window 906, which can include more detailed information regarding the information being displayed in the source summary window 904. It is noted that while the example of FIG. 20 is specific to the user performing a gesture relevant to the information being displayed in one of the source summary windows 806, the invention itself is not so limited, and the gesture could also be relevant to either the information being displayed in the main notification window 802, or one of the journal entries journaled in the journal window 804.

As can be appreciated, the stream-stacking aspect of the invention as has been described and as has been illustrated in conjunction with FIGS. 19 and 20 is amenable to various extensions. For example, there can be a "simple mode" toggle, in which one or more of the respective windows 802, 804 and 806 are displayed. Furthermore, the number of source summary windows 806 can be increased or decreased by the user. The source summary windows 806 can also in one aspect be minimized so that the information displayed therein is an icon representing the information sources for the windows 806, such that user-caused cursor hovering over a particular of the windows 806 causes display of the information generated by the corresponding source.

Figure 21:
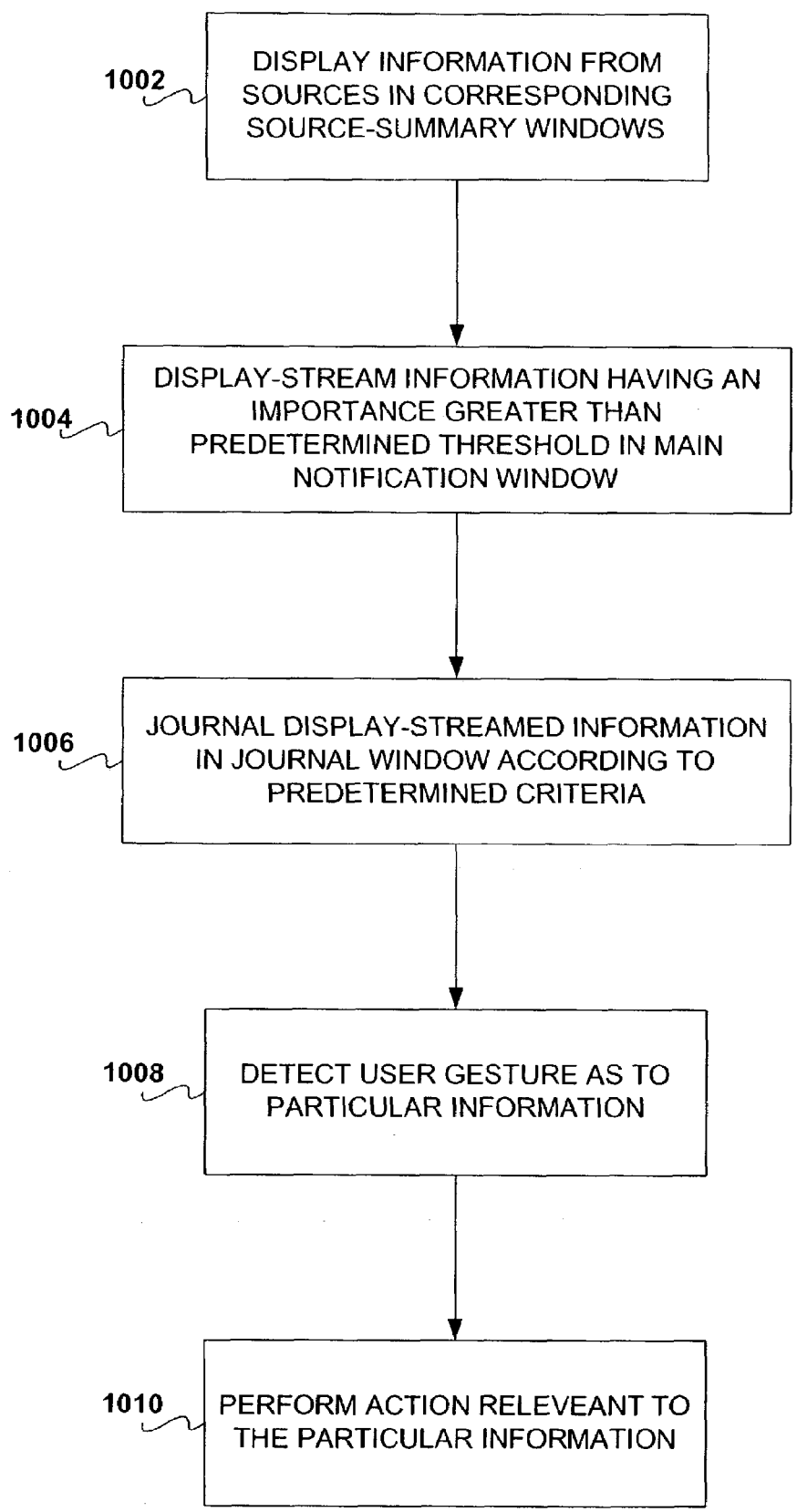
FIG. 21 is a flow chart diagram illustrating a methodology providing stream-stacking in accordance with an aspect of the present invention.
Figure 22:
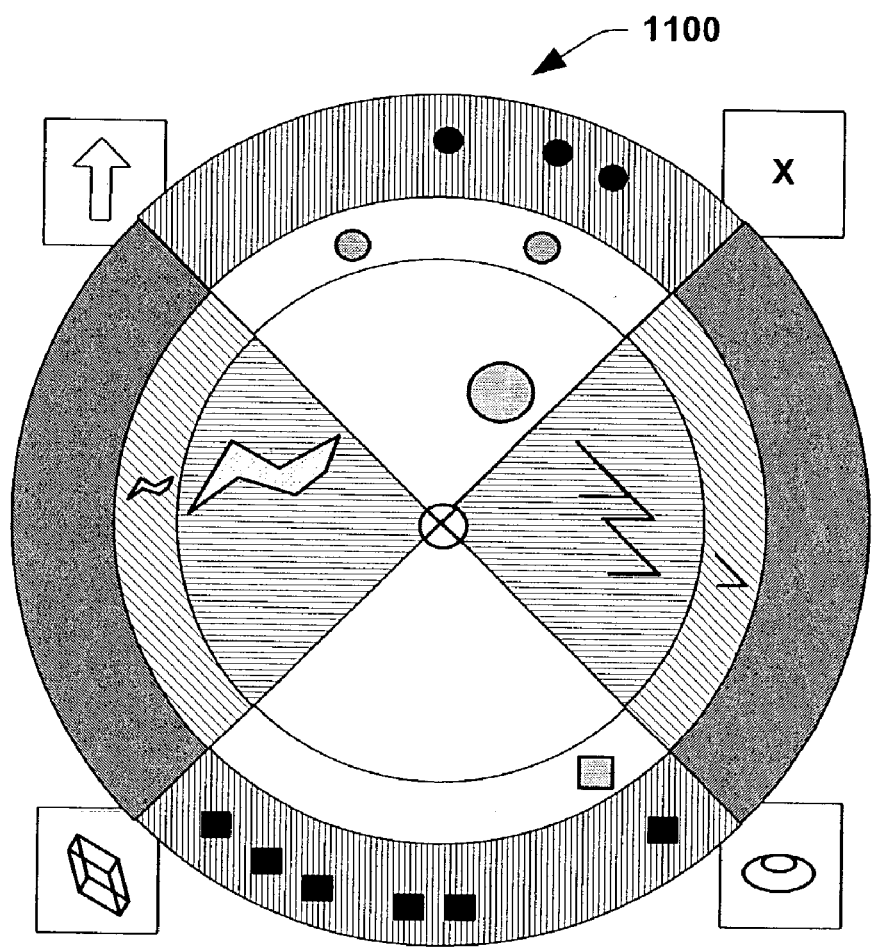
FIG. 22 is a diagram illustrating an exemplary display in accordance with an alternative aspect of the present invention.

Referring now to FIG. 21, a flow diagram illustrates a methodology 1000 of a stream-stacking aspect of the present invention. The methodology 1000 can incorporate aspects of the stream-stacking as it has been described in conjunction with FIGS. 19 and 20.

At 1002, information from a number of sources is displayed. The information from respective sources is displayed in a corresponding source-summary window. The information can be un-requested information unrelated to a primary task of the user. In 1004, information that has an importance value greater than a threshold, such as a predetermined threshold, is display-streamed in a main notification window. The information as displayed in the main notification window can in one aspect be more detailed than as it is displayed in the source-summary window corresponding to the source of the information. At 1006, the information that has been display-streamed in the main notification window is journaled in the journal window, such as by a journal entry being added thereto, according to a predetermined criteria.

As has been described, the user is enabled to have an action performed relevant to substantially any information being displayed in substantially any of the source-summary windows, the main notification window, and/or journaled in the journal window, by performing a predetermined user-gestured as to the particular (user-desired) information. Thus, in 1008, such a user gesture is detected as to particular information that is being displayed in one of the source-summary windows, the main notification window, and/or which has a journal entry in the journal window. In response thereto, in 1010 an action is performed that is relevant to this information. For example, a more detailed version of the information can be displayed in one aspect of the present invention.

The various aspects of the present invention as has been described in this section of the description is referred to as a stream-stacking since information can be both "streamed" in the main notification window, as well as is stacked in both the source summary windows and the journal window. Thus, a user is able to learn of important information by referencing the main notification window, and is able to examine past information that has been displayed in the main notification window by referring to corresponding journal entries for this information in the journal window. The user can also observe the current information being generated by a given source, such as a notification source, by referencing the source summary window for that source. The information of the source summary windows can be displayed regardless of its importance, whereas more important information is generally displayed in the main notification window and journaled in the journal window.

Furthermore, in one aspect of the invention, high-level summary information is associated with respective sources. For example, an email-related source may display information about the overall status of information from that source—such that there are ten unread messages with a given priority, and the highest priority message is from a particular user regarding a particular subject matter. Clicking or hovering on the source can then cause the display of a broader user interface for the source application, the most recent notification, and so forth. In another aspect of the invention, information is streamed or cycled within each source display, such as independent versions of the stream-cycling aspects of the invention described in the previous section of the description. Moreover, in other aspects of the present invention, wherein a larger main notification window is included, clicking or otherwise selecting a particular source can cause display of the details of the source information, such that this information is focused. Subsequent selection of the notification can thus cause display of even further details of this information, and/or a broader user interface for this source.

In the previous sections of the description, different modes by which information can be presented to a user have been described, including a pulsing mode, a stream-cycling mode, and a stream-stacking mode. In this section of the description, further description is provided with respect to the manner by which a user can interact with the information presented via the respective modes. While various user gestures and audio heralds have been noted in the previous sections of the description, this section of the description provides a more detailed description as to how user interaction can be achieved.

For example, user gestures for communicating a desire for additional information, and for answering questions posed about potential links and services, are described. In one aspect, the user causing a hovering of the cursor over a source in the stream-stacking mode can be a signal to the system to provide more detailed information about the summary, can appear in a pop-up window, as has been described. Thus, the user causing the hovering of the cursor over a window in this aspect is utilized as an implicit request from the user for the display of more details about the notification content. For example, if there is a weather report, cursor hovering is a manner for the user to ask for more details on the weather, such as humidity, five-day forecast, and so forth.

Other gestures can be detected as well in accordance with the present invention. For example, the user positioning the cursor over information that is being streamed, and then selecting the information, such as by clicking on a button of a pointing device like a mouse, can be employed in different manners. Selection of Universal Resource Locator (URL) addresses provided in the display, for example, may cause access of the information referred to by these addresses, for instance. Clicking in nonspecific regions of an information display asking a question (e.g., "Shall I schedule that for you?") can as another example be taken as an assumed "yes" acknowledging the user's intention to receive a service, while the default of no selection can be determined as a "no" answer.

In addition, action and timing for communicating with applications, the notification manager, and/or providing evidence about user awareness of the notification are described. For example, user gestures utilizing input devices such as the keyboard or the mouse within some time after a notification appears can be provided by the user to convey "Tell me more about this notification." A user gesture such as a wiggle of a pointing device like a mouse or the moving of the cursor into a predefined corner of the display can be utilized for the user to convey to the system, "What was that?"; "Show that to me again"; or, "Tell me more about this", depending on the initial notification conveyed to the user. For example, if the notification was an audio herald, such a user gesture (e.g., such as in a corner of the display) could be interpreted as the user asking "What was that?", leading to the display of the information in a notification window, in accordance with a pulsed mode as has been described.

Gestures can also be employed in human-computer interactions to indicate to the notification manager, or more explicitly, to gather information that is relayed to the notification manager, that the user has seen a notification. For example, the user may cause the cursor to hover over a notification within some time frame after the notification has been displayed, as a manner to indicate to the notification system that the user has seen this notification. Thus, the system then can determine not to re-attempt relaying this notification to the user. A more complex interaction can also provide this indication, such as the user selecting a link presented in the window.

User interaction with a notification journal, as such a journal has been described in a preceding section of the description, is next described. That is, as has been noted, notification summaries can be stored in a notification journal in the stream-stacking mode of the invention. These can be organized by time, notification source, message class, and so forth, and enable users to revisit or review notifications that may have been missed earlier. Selecting a journal entry thus enables users to redisplay the notification.

According to another aspect of the present invention, the employment of audio in lieu of or as an enhancement to the display of information is described. For example, audio heralds may be utilized for announcing the display of notifications that exceed a threshold (such as a predetermined threshold), for example, and can be employed to further call the user's attention to the notifications. In addition, different sounds can be associated with different types of notifications. For example, a scheduling-related notification may have a different sound than an e-mail-related notification.

It is also noted, that while in this application the use of text and/or text and graphics has been described to display information, the invention is not limited to text and/or text and graphics. For example, in one aspect, the information can be displayed graphically, wherein different shapes and colors are utilized to indicate the nature and priority of information. As another example, the closer the displayed objects are to the center of the display, the more important they are, wherein different color regions represent different sources of information. That is, the invention is not limited to a particular notion of high-level graphical and/or textual metaphors associated with the information.

Figure 23:
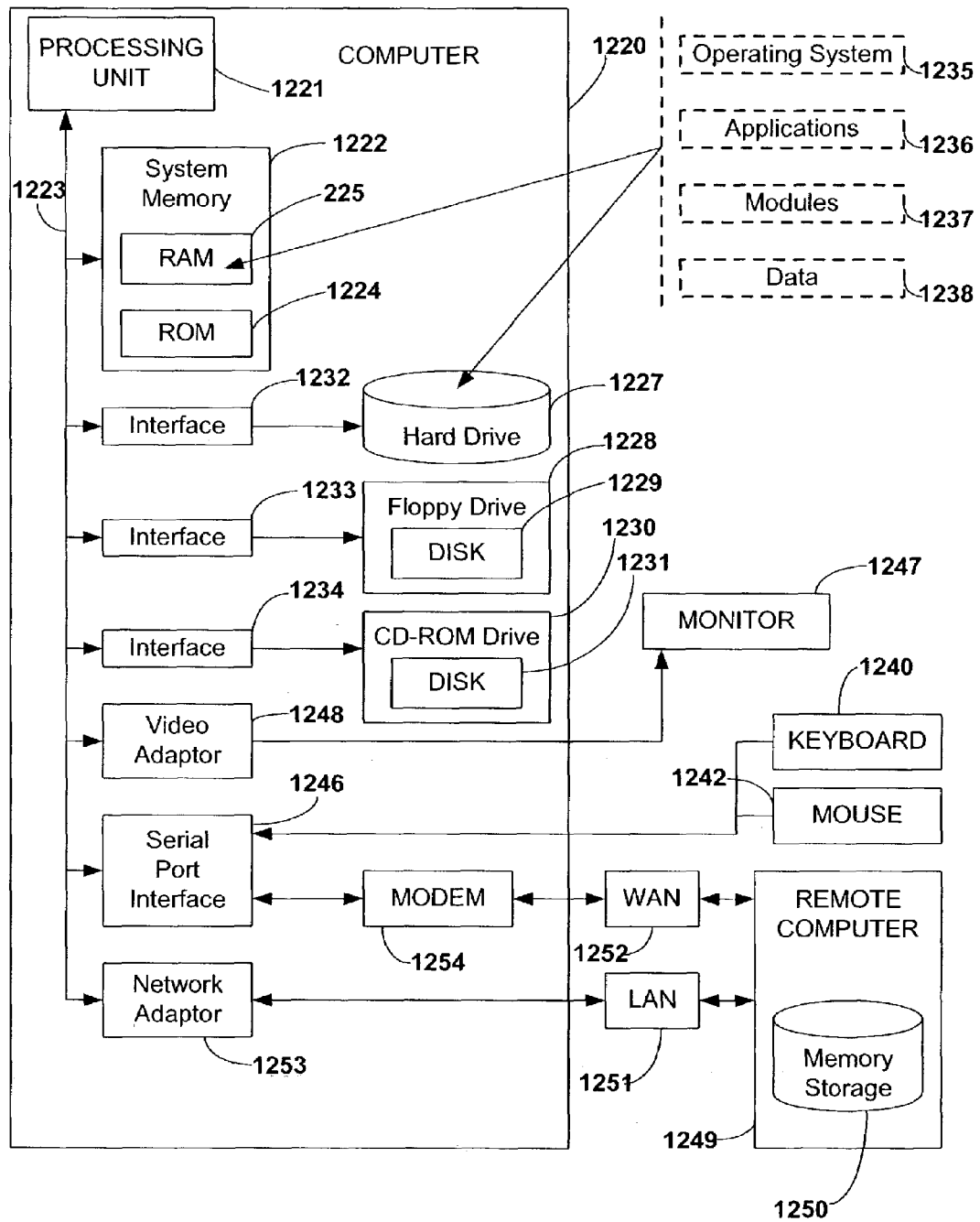
FIG. 23 is a schematic block diagram illustrating a suitable operating environment in accordance with an aspect of the present invention.

As an example of an alternative information display aspect of the present invention, is illustrated in the exemplary diagram of FIG. 23. According to this aspect of the invention, information can be displayed in the predetermined area 302 of the desktop screen 300, for example, depicted in FIG. 14. Furthermore, in one aspect, the user can switch among different modes, including a scope mode. For example, a system can include a display, a processing system, and a machine-readable medium storing a computer program executed by the processor to cause entry into one of the modes, such as the scope mode. Furthermore, besides the user switching among the modes, in one aspect, a notification manager, as has been described in the previous section of the detailed description, can make the decision to switch modes, for example.

In the exemplary scope interface depicted in FIG. 23, different shapes and colors are utilized to indicate the nature and priority of information. For example, there can be a circular display object 1100 (e.g., wheel) in the corner of the screen, divided into one or more parts. It is noted that other shapes may be employed. Respective parts can be a different color, and indicate a different type or source of information. Objects within respective parts of the display object 1100, such as circles, squares, arrows, and lines, for example, can represent notifications, priorities, and/or events from the source of information of the respective part, and/or of the type of information of the respective part. The closer the objects are to the center of display object 1100, the more important they are—that is, notifications, messages and/or other type of information that have been assigned an importance value. Thus, concentric circles within the wheel can in one aspect demarcate different priority levels. Hovering over an object with a cursor can cause textual information regarding that object to be displayed. Hovering over a portion of the display object 1100 (but not over an object within the display object) with a cursor, for example, can cause textual information indicating the type of information or the source of information for that portion of the display object 1100. The textual information can be displayed as a tool tip, for example.

In order to provide a context for the various aspects of the invention, FIG. 23 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 23, an exemplary system for implementing the various aspects of the invention includes a computer 1220, including a processing unit 1221, a system memory 1222, and a system bus 1223 that couples various system components including the system memory to the processing unit 1221. The processing unit 1221 may be any of various commercially available processors. It is to be appreciated that dual microprocessors and other multi-processor architectures also may be employed as the processing unit 1221.

The system bus may be any of several types of bus structure including a memory bus or memory controller, a peripheral bus, and a local bus using any of a variety of commercially available bus architectures. The system memory may include read only memory (ROM) 1224 and random access memory (RAM) 1225. A basic input/output system (BIOS), containing the basic routines that help to transfer information between elements within the computer 1220, such as during start-up, is stored in ROM 1224.

The computer 1220 further includes a hard disk drive 1227, a magnetic disk drive 1228, e.g., to read from or write to a removable disk 1229, and an optical disk drive 1230, e.g., for reading from or writing to a CD-ROM disk 1231 or to read from or write to other optical media. The hard disk drive 1227, magnetic disk drive 1228, and optical disk drive 1230 are connected to the system bus 1223 by a hard disk drive interface 1232, a magnetic disk drive interface 1233, and an optical drive interface 1234, respectively. The drives and their associated computer-readable media provide nonvolatile storage of data, data structures, computer-executable instructions, etc. for the computer 1220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 1225, including an operating system 1235, one or more application programs 1236, other program modules 1237, and program data 1238. It is noted that the operating system 1235 in the illustrated computer may be substantially any suitable operating system.

A user may enter commands and information into the computer 1220 through a keyboard 1240 and a pointing device, such as a mouse 1242. Other input devices (not shown) may include a microphone, a joystick, a game pad, a satellite dish, a scanner, or the like. These and other input devices are often connected to the processing unit 1221 through a serial port interface 1246 that is coupled to the system bus, but may be connected by other interfaces, such as a parallel port, a game port or a universal serial bus (USB). A monitor 1247 or other type of display device is also connected to the system bus 1223 via an interface, such as a video adapter 1248. In addition to the monitor, computers typically include other peripheral output devices (not shown), such as speakers and printers.

The computer 1220 may operate in a networked environment using logical connections to one or more remote computers, such as a remote computer 1249. The remote computer 1249 may be a workstation, a server computer, a router, a peer device or other common network node, and typically includes many or all of the elements described relative to the computer 1220, although only a memory storage device 1250 is illustrated in FIG. 23. The logical connections depicted in FIG. 23 may include a local area network (LAN) 1251 and a wide area network (WAN) 1252. Such networking environments are commonplace in offices, enterprise-wide computer networks, Intranets and the Internet.

When employed in a LAN networking environment, the computer 1220 may be connected to the local network 1251 through a network interface or adapter 1253. When utilized in a WAN networking environment, the computer 1220 generally may include a modem 1254, and/or is connected to a communications server on the LAN, and/or has other means for establishing communications over the wide area network 1252, such as the Internet. The modem 1254, which may be internal or external, may be connected to the system bus 1223 via the serial port interface 1246. In a networked environment, program modules depicted relative to the computer 1220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 1220, unless otherwise indicated. Such acts and operations are sometimes referred to as being computer-executed. It will be appreciated that the acts and symbolically represented operations include the manipulation by the processing unit 1221 of electrical signals representing data bits which causes a resulting transformation or reduction of the electrical signal representation, and the maintenance of data bits at memory locations in the memory system (including the system memory 1222, hard drive 1227, floppy disks 1229, and CD-ROM 1231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

INDUSTRIAL APPLICABILITY

This invention has industrial applicability in the area of computers, computer software and information technologies.

What is claimed is:

1. A notification system, comprising:
   a context analyzer to determine a context associated with an entity and to access and store information regarding context information and notification parameters;
   a notification manager to convey one or more notifications to the entity based at least in part on the determined context;
   at least one notification source to generate the one or more notifications; and
   at least one notification sink to receive the one or more notifications, the at least one notification sink having parameters associated with it representing:
   a cost of communication of the notification sink indicating a communication cost incurred by the entity when receiving information contained within a notification conveyed to the notification sink; and
   a cost of disruption of the notification sink indicating a disruption cost incurred by the entity when receiving information contained within a notification conveyed to the notification sink.

2. The system of claim 1, wherein the entity comprises a user, an agent, a process, a server, a computer, a machine, a company, an organization, a business, a computer program, a service, or a thread or combinations thereof.

3. The system of claim 1, wherein the at least one notification source is configured to generate one or more notifications intended for the entity.

4. The system of claim 1, wherein the at least one sink is configured to provide the notifications to the entity.

5. The system of claim 1, wherein the context analyzer comprises a notification parameters store to store default notification preferences for the entity as a profile.

6. The system of claim 1, wherein the context analyzer is configured to determine a current context of a user based on at least one context source.

7. The system of claim 6, wherein the at least one context source comprises visual information of the user, desktop information of the user, personal-information-manager (PIM) information of the user, current time and day, mobile device usage of the user, or location of the user or combinations thereof.

8. The system of claim 6, wherein the context analyzer is configured to determine the current context based on the at least one context source by utilizing a statistical model, a profile, a direct access of user location and activity, or a real-time user specification of user state or combinations thereof.

9. The system of claim 1, wherein the notifications generated by the at least one notification source comprise e-mail, instant messaging, system messages, automated assistance, results from persistent, ongoing queries to one or more search facilities or services, updates to the number or content of documents available in a shared file system, updates about organizational information, information that comes available that is related to a specified content, document or topic, Internet-related information and news services, people availability, location, proximity, scheduling queries, proximities or locations of companies and organizations or combinations thereof.

10. The system of claim 1, wherein the at least one notification source has one or more parameters associated with it representing:
    a classification of a current notification generated by the notification source indicating value of information contained in the current notification; or
    a time criticality of the current notification generated by the notification source indicating time-dependent decay of the value of the information contained in the current notification or a combination thereof.

11. The system of claim 1, wherein the at least one notification source has parameters associated with it representing:
    a message class of a current notification generated by the notification source indicating a type of communication of the current notification;
    a relevance of the current notification indicating a likelihood of the relevance of information contained in the current notification;
    a novelty of the current notification indicating a likelihood of whether an entity already knows the information; or
    a fidelity of the current notification indicating a loss of value to the entity of the information upon truncation of the information
    or combinations thereof.

12. The system of claim 1, wherein the at least one notification source comprises a pull-type notification source or a push-type notification source or a combination thereof.

13. The system of claim 1, wherein the at least one notification sink comprises a desktop computer, a PDA, a cellular phone, a pager or an automotive computerized device or combinations thereof.

14. The system of claim 1, wherein the notification manager is configured to perform a decision-theoretic analysis of the notifications from the at least one notification source based on the information stored by the context analyzer to determine which of the notifications from the at least one notification source should be conveyed to which of the at least one notification sink.

15. The system of claim 1, wherein the notification manager is configured to perform a heuristic analysis of the notifications from the at least one notification source based on the information stored by the context analyzer to determine which of the notifications from the at least one notification source should be conveyed to which of the at least one notification sinks.

16. A notification system, comprising:
    a context analyzer to store information regarding notification parameters, the context analyzer comprising:
        a user notification parameters store to store default notification preferences for a user, and
        a user context module to determine a current context of the user based on at least one context source;
    at least one notification source to generate notifications intended for the user;
    at least one notification sink to provide the notifications to the user; and
    a notification manager to convey the notifications generated by the at least one notification source to the at least one notification sink based on the information stored in the context analyzer by performing a decision-theoretic analysis,
    wherein the at least one notification sink is configured to provide the notifications to the user and has parameters associated with it representing:
        a cost of communication of the notification sink indicating a communication cost incurred by the user when receiving information contained within a notification conveyed to the notification sink; and
        a cost of disruption of the notification sink indicating a disruption cost incurred by the user when receiving information contained within a notification conveyed to the notification sink.

* * * * *